United States Patent
Pourahmadi et al.

(10) Patent No.: US 10,181,923 B2
(45) Date of Patent: Jan. 15, 2019

(54) APPARATUS AND METHOD FOR GENERATING AND USING A PILOT SIGNAL

(71) Applicant: Motorola Mobility LLC, Chicago, IL (US)

(72) Inventors: Vahid Pourahmadi, Urbana, IL (US); Vijay Nangia, Algonquin, IL (US)

(73) Assignee: Motorola Mobility LLC, Chicago, IL (US)

( * ) Notice: Subject to any disclaimer, the term of this patent is extended or adjusted under 35 U.S.C. 154(b) by 102 days.

(21) Appl. No.: 15/293,454

(22) Filed: Oct. 14, 2016

(65) Prior Publication Data

US 2017/0126348 A1    May 4, 2017

Related U.S. Application Data

(60) Provisional application No. 62/248,336, filed on Oct. 30, 2015.

(51) Int. Cl.
*H04J 13/00* (2011.01)
*H04L 5/00* (2006.01)
(Continued)

(52) U.S. Cl.
CPC .......... *H04J 13/0062* (2013.01); *H04L 5/005* (2013.01); *H04L 5/0048* (2013.01);
(Continued)

(58) Field of Classification Search
CPC .. H04J 13/0062; H04L 5/005; H04W 72/0453
(Continued)

(56) References Cited

U.S. PATENT DOCUMENTS

2004/0190560 A1* 9/2004 Maltsev .............. H04L 27/2663
370/503
2005/0163265 A1* 7/2005 Gupta ...................... H04L 5/06
375/343

(Continued)

*Primary Examiner* — Stephen J Clawson
(74) *Attorney, Agent, or Firm* — Kunzler, PC

(57) ABSTRACT

A method and apparatus is for generating a modulation signal that comprises a resource block. A resource element sequence, $M_n^P$, of M pilot symbols is determined that corresponds to an $n^{th}$ of N subcarriers. A pilot frequency domain sample sequence, $r_n^P$, corresponding to the resource element sequence $M_n^P$ comprises a quantity, $R_n^{NZ}$, of non-zero magnitude pilot frequency domain samples. $R_n^{NZ}$ is determined based on M and an excess bandwidth, α, of an adjacent subcarrier filter. The resource element sequence $M_n^P$, which has no inter-subcarrier interference, is multiplexed with N−1 resource element sequences to form the resource block. The modulation signal is generated by modulating each subcarrier of the N subcarriers with a corresponding resource element sequence of the N resource element sequences and filtering each of the modulated subcarriers using a subcarrier filter. The resource element sequence $M_n^P$ is used during receiving for efficiently determining a channel estimate.

19 Claims, 14 Drawing Sheets

(51) Int. Cl.
*H04L 25/03* (2006.01)
*H04W 72/04* (2009.01)
*H04L 27/26* (2006.01)

(52) U.S. Cl.
CPC ...... *H04L 25/03006* (2013.01); *H04L 27/264* (2013.01); *H04L 27/2613* (2013.01); *H04W 72/0453* (2013.01); *H04L 5/0007* (2013.01)

(58) Field of Classification Search
USPC ........................................................ 370/329
See application file for complete search history.

(56) References Cited

U.S. PATENT DOCUMENTS

2007/0082696 A1* 4/2007 Wang ................. H03M 13/271
 455/550.1
2008/0220723 A1* 9/2008 Krishnamoorthi ..........................
 H04L 27/2655
 455/59
2008/0291817 A1* 11/2008 Gupta ................. H04L 27/2613
 370/208
2010/0172427 A1* 7/2010 Kleider ............... H04L 25/0232
 375/260

* cited by examiner

900

905 — CIRCULARLY FILTER EACH MODULATED SUBCARRIER USING THE CORRESPONDING ONE OF THE N SUBCARRIER FILTERS.

1005 — DETERMINE $R_n^{NZ} = 2(M-1-M/2\{(1+\alpha)\}]+1$

1105 — FORM THE PILOT FREQUENCY DOMAIN SEQUENCE TO COMPRISE THE NON-ZERO MAGNITUDE PILOT FREQUENCY DOMAIN SAMPLES DEFINED AS CONTIGUOUS LOW-FREQUENCY SAMPLES CORRESPONDING TO THE FREQUENCY SAMPLES CLOSE TO THE CENTER OF THE PILOT SUBCARRIER AND A QUANTITY OF ZERO MAGNITUDE PILOT FREQUENCY DOMAIN SAMPLES THAT IS DETERMINED BASED ON A SUBCARRIER FILTER ROLL-OFF FACTOR AND M.

DETERMINE A SECOND RESOURCE ELEMENT SEQUENCE OF M PILOT SYMBOLS THAT FORM A $q^{th}$ OF THE N SUBCARRIERS, WHEREIN q ≠ n, AND WHEREIN PILOT FREQUENCY DOMAIN SAMPLES OF THE $q^{th}$ SUBCARRIER CORRESPONDING TO THE SECOND RESOURCE ELEMENT SEQUENCE ARE EACH DETERMINED AS AT LEAST A PHASE SHIFT Θ(i) OF THE CORRESPONDING PILOT FREQUENCY DOMAIN SAMPLES OF THE $n^{th}$ SUBCARRIER, AND WHEREIN Θ(i)=Q·i, AND WHEREIN Q IS A PHASE CONSTANT.

1310

MULTIPLEX THE SECOND RESOURCE ELEMENT SEQUENCE WITH THE RESOURCE ELEMENT SEQUENCES THAT CORRESPOND TO THE N-1 SUBCARRIERS THAT ARE NOT THE $q^{th}$ SUBCARRIER TO FORM THE FIRST RESOURCE BLOCK.

DETERMINE A SECOND RESOURCE ELEMENT SEQUENCE OF M PILOT SYMBOLS THAT FORM A $q^{th}$ OF THE N SUBCARRIERS, WHEREIN $q \neq n$, AND WHEREIN THE PILOT SYMBOLS OF THE $q^{th}$ SUBCARRIER ARE EACH DETERMINED AS A CYCLICAL TIME SHIFT OF THE PILOT SYMBOLS OF THE $n^{th}$ SUBCARRIER.

1410

MULTIPLEX THE SECOND RESOURCE ELEMENT SEQUENCE WITH THE RESOURCE ELEMENT SEQUENCES THAT CORRESPOND TO THE N-1 SUBCARRIERS THAT ARE NOT THE $q^{th}$ SUBCARRIER TO FORM THE FIRST RESOURCE BLOCK.

DETERMINE A SECOND RESOURCE ELEMENT SEQUENCE OF M PILOT SYMBOLS THAT CORRESPOND TO A $q^{th}$ OF N SUBCARRIERS OF A SECOND RESOURCE BLOCK, WHEREIN A PILOT FREQUENCY DOMAIN SAMPLES SEQUENCE CORRESPONDING TO THE SECOND RESOURCE ELEMENT SEQUENCE COMPRISES NON-ZERO MAGNITUDE PILOT FREQUENCY DOMAIN SAMPLES, AND WHEREIN THE NON-ZERO MAGNITUDE PILOT FREQUENCY DOMAIN SAMPLES OF THE PILOT FREQUENCY DOMAIN SAMPLES SEQUENCE OF THE SECOND RESOURCE BLOCK ARE DETERMINED AS A CYCLICAL SHIFTS OF THE RESPECTIVE NON-ZERO MAGNITUDE PILOT FREQUENCY DOMAIN SAMPLES OF THE PILOT FREQUENCY DOMAIN SAMPLES SEQUENCE OF THE FIRST RESOURCE ELEMENT SEQUENCE OF THE FIRST RESOURCE BLOCK.

_1510_

MULTIPLEX THE SECOND RESOURCE ELEMENT SEQUENCE WITH THE N-1 RESOURCE ELEMENT SEQUENCES THAT CORRESPOND TO THE N-1 SUBCARRIERS THAT ARE NOT THE $q^{th}$ SUBCARRIER TO FORM THE FIRST RESOURCE BLOCK.

_1515_

GENERATE A SECOND MODULATION SIGNAL BY MODULATING EACH SUBCARRIER WITH A CORRESPONDING RESOURCE ELEMENT SEQUENCE OF THE SECOND RESOURCE BLOCK, WHICH GENERATES N MODULATED SUBCARRIERS OF THE SECOND RESOURCE BLOCK, AND FILTER EACH OF THE N MODULATED SUBCARRIERS OF THE SECOND RESOURCE BLOCK USING A CORRESPONDING ONE OF N SUBCARRIER FILTERS.

DETERMINE A SECOND RESOURCE ELEMENT SEQUENCE, , OF M PILOT SYMBOLS THAT CORRESPOND TO $q^{th}$ OF N SUBCARRIERS OF A SECOND RESOURCE BLOCK, WHEREIN A PILOT FREQUENCY DOMAIN SAMPLES SEQUENCE CORRESPONDING TO THE SECOND RESOURCE ELEMENT SEQUENCE COMPRISES $R_q^{NZ}$ NON-ZERO MAGNITUDE VALUES, AND WHEREIN THE $R_q^{NZ}$ NON-ZERO MAGNITUDE PILOT FREQUENCY DOMAIN SAMPLES ARE BASED ON A FIRST ZADOFF-CHU SEQUENCE HAVING A FIRST BASE, AND WHEREIN THE $R_n^{NZ}$ NON-ZERO MAGNITUDE PILOT FREQUENCY DOMAIN SAMPLES ARE BASED ON A SECOND ZADOFF-CHU SEQUENCE HAVING A SECOND BASE, AND WHEREIN THE FIRST BASE IS DIFFERENT THAN THE SECOND BASE.

1710

MULTIPLEX THE SECOND RESOURCE ELEMENT SEQUENCE WITH THE N-1 RESOURCE ELEMENT SEQUENCES THAT CORRESPOND TO THE N-1 SUBCARRIERS THAT ARE NOT THE $q^{th}$ SUBCARRIER TO FORM THE FIRST RESOURCE BLOCK.

1715

GENERATE A SECOND MODULATION SIGNAL BY MODULATING EACH SUBCARRIER WITH A CORRESPONDING RESOURCE ELEMENT SEQUENCE OF THE SECOND RESOURCE BLOCK, WHICH GENERATES N MODULATED SUBCARRIERS OF THE SECOND RESOURCE BLOCK, AND FILTER EACH OF THE N MODULATED SUBCARRIERS OF THE SECOND RESOURCE BLOCK USING A CORRESPONDING ONE OF N SUBCARRIER FILTERS.

*FIG. 17*

APPARATUS AND METHOD FOR GENERATING AND USING A PILOT SIGNAL

FIELD OF THE INVENTION

The present invention relates generally to data transmission and reception, and more specifically to the use of a pilot signal to provide channel estimation at a receiver.

BACKGROUND

Pilot signals (or reference signals) are commonly used in data transmissions to allow a receiver to make an estimate of characteristics of a radio channel in which the data is transmitted, allowing improved reception accuracy. For the proposed version of transmission scheme known as Generalized Frequency Division Multiplexing (GFDM), two pilot schemes have been discussed, a preamble technique and a scattered pilot symbol technique with interference pre-cancellation. The preamble technique is based on adding pilot symbols (time division multiplexed symbols that occupy all subcarriers or a significant portion of the carrier bandwidth) as a preamble to a modulated data block. The scattered pilot symbol technique adds pilot symbols (frequency division multiplexed) within a multiplexed data block. Each technique has certain advantages and drawbacks. In particular, the preamble technique allows reuse of known preamble techniques but has the possibility of higher overhead and out of band emissions. The scattered pilot symbol with interference pre-cancellation may provide fairly efficient overhead but may incur a power penalty and additional hardware for high dynamic range between subcarriers. Furthermore, the use of this scheme for multiple antennas is unclear.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments. The description is meant to be taken in conjunction with the accompanying drawings in which:

FIGS. 9-15 are flow charts that show some additional steps that may be performed in the method described with reference to FIG. 8, in accordance with some embodiments.

FIG. 17 is a flow chart shows some steps that may be used in the method for generating a modulation signal described above with reference to FIG. 8, in accordance with some embodiments.

Figure 1:
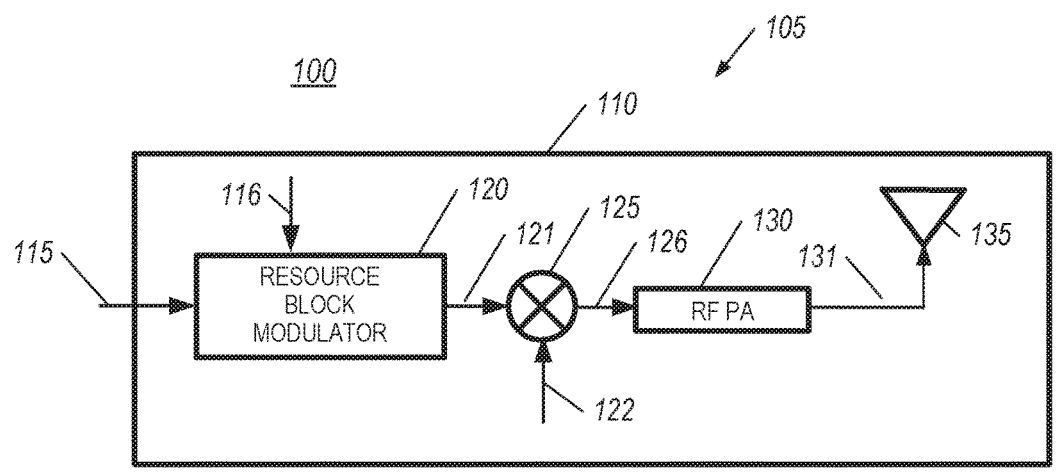
FIG. 1 is a functional block diagram that shows a transmitter section of an electronic device, in accordance with certain embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of the embodiments.

DETAILED DESCRIPTION

In the description below, like reference numerals are used to describe the same, similar or corresponding parts in the several views of the drawings. Numerous specific details are set forth to provide a full understanding of the subject technology. It will be obvious, however, to one ordinarily skilled in the art that the subject technology may be practiced without some of these specific details. In other instances, well-known structures and techniques have not been shown in detail so as not to obscure the subject technology.

Embodiments described herein generally relate to generating and using pilot symbols within Generalized Frequency Division Multiplexing (GFDM) protocols, which may include Cyclic Prefix Orthogonal Frequency Division Multiplexing (CP-OFDM) and Single Carrier Frequency Division Multiplexing (SC-FDM protocols). Certain embodiments describe using one or more subcarriers exclusively for pilot symbols, wherein the pilot symbols are designed to avoid inter-subcarrier interference.

Referring to FIG. 1, a functional block diagram 100 shows a transmitter section 110 of an electronic device 105, in accordance with certain embodiments. The electronic device 105 may a transmitter only device, such as, for one example, a cellular base station transmitter. Another example would be a low power sensor, such as a medical or environmental monitor. The electronic device 105 may be an electronic device that has an associated transmitter, such as any type of personal two way communication device, including but not limited to cellular telephones, tables, and computers. The electronic device 105 may be operating at any radio carrier frequency. The transmitter section 110 comprises a resource block modulator 120 that accepts as an input a series of data symbols 115, each of which may be complex values (just one example of such complex valued symbols are symbols that are 16-QAM (quadrature amplitude modulated)). The resource block modulator 120 determines values 116 which characterize resource blocks currently being formed from the series of data symbols 115. Using the values 116, the resource block modulator 120 generates one or more data symbol sequences and determines one or more pilot symbol sequences (or reference symbol sequences) from stored data or by calculation. The pilot symbol sequences are formed in accordance with unique techniques described more fully below that render them largely free from inter-subcarrier interference. The data symbol sequences and pilot symbol sequences are used by the resource block modulator 120 to form modulated resource blocks 121. A resource element sequence is one of either a data symbol sequence or a pilot symbol sequence.

The values 116 may include two integer values, M and N, which define, respectively, a quantity of resource element time slots (or symbol-block length) and a quantity of subcarriers of the resource blocks currently being formed, as well as information (such as a base subcarrier frequency and subcarrier separation or subcarrier spacing) that determines characteristics of subcarrier frequencies, as well as subcarrier filter characteristics. The values 116 that characterize the resource blocks that are being formed and the pilot symbol sequences may be determined from values stored persistently within the electronic device 105, such as in a table, or that are stored transiently by the electronic device 105, such as data received by the electronic device 105 in a control message. Each of the one or more pilot symbol sequences is associated with a different one of the N subcarriers. These may be termed pilot subcarriers. The subcarriers in general are typically arranged as adjacent subcarriers, but pilot subcarriers are typically non-adjacent to other pilot subcarriers. The data symbols may represent a wide variety of types of information, such as audio (music, voice, etc.), video (camera images, TV, etc.) and telemetry (environmental sensors, radar results, etc.).

Each resource block is then used to generate one of the modulated resource blocks of signal 121, as follows. Each resource element sequence (pilot or data symbol sequence) of a resource block is separately pulse shaped with a filter $\tilde{g}[n]$ where $\tilde{g}[n]$ is a circular filter with a period M×N. The time period for each symbol is a reciprocal of the subcarrier frequency spacing. A resulting symbol block can be written as follows:

$$x[k] = \sum_{i=0}^{M-1} \sum_{n=0}^{N-1} d_n[i]\tilde{g}[k-iN]e^{j2\pi\frac{nk}{N}} \qquad (1)$$

In equation (1), k is the index that identifies modulated resource element samples, n is the index that identifies specific subcarriers, and i is the index for time slots (each time slot has the time period of a symbol). More than one pilot symbol sequence may be included in each resource block, at intervals that have been determined to be at most the minimum needed such that radio channel characteristics determined for the pilot subcarriers provide sufficiently accurate representations of the radio channel characteristics of the one or more subcarriers comprising data symbols. A cyclical prefix is added to form a complete modulated resource block of signal 121. The coherence time of the radio channel (i.e., the time duration over which the radio channel is assumed to be sufficiently constant) is assumed typically to be at least the symbol-block length (M time periods) such that the radio channel can be assumed to be almost constant over the symbol-block. Subcarriers with no associated symbol sequence are not modulated and are considered as null subcarriers. The modulated resource block of signal 121 is coupled to an RF modulator 125, which mixes it with carrier reference 122, which may be a quadrature reference signal. The resulting modulated RF carrier signal 126 is coupled to an RF power amplifier 130. The resulting amplified modulated RF carrier signal is coupled to an antenna 135 and radiated. An RF final stage comprises the RF modulator 125, the RF power amplifier 130, and the antenna 135.

In some embodiments, such as Multiple Input, Multiple Output (MIMO) embodiments, modulated resource blocks in signal 121 are generated for simultaneous transmission using the same RF carrier frequency. The pilot symbol sequences in each resource block intended for simultaneous transmission are determined in a manner described below that renders pilot symbol sequences of equivalent subcarriers in the different resource blocks (intended for simultaneous transmission) as orthogonal or largely orthogonal. The data symbol sequences and possibly the pilot symbol sequences of the two or more resource blocks in signal 121 intended for simultaneous transmission may be precoded, for example, by applying a precoding matrix. The two or more resource blocks in signal 121 intended for simultaneous transmission are modulated and the modulated signals are coupled to RF modulators 145 (not shown in FIG. 1) and amplifiers 150 (not shown in FIG. 1) to generate simultaneous modulated RF signals that are amplified and coupled to additional antennas (not shown in FIG. 1) for transmission. The multiple modulated RF signals may comprise identical data symbols or differing data symbols, depending on system configuration (e.g., diversity versus spatial division multiplexing). In MIMO embodiments or single transmitter embodiments, one antenna may be used for both transmission and interception by including a duplexer per receive-transmit signal pair, as is known in the art.

Figure 2:
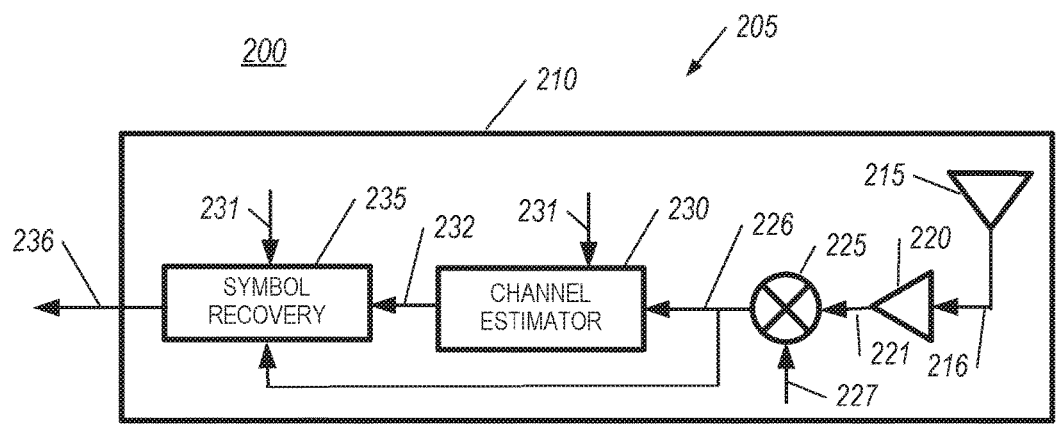
FIG. 2 is a functional block diagram that shows a receiver section of an electronic device, in accordance with certain embodiments.

Referring to FIG. 2, a functional block diagram 200 shows a receiver section 210 of an electronic device 205, in accordance with certain embodiments. The electronic device 205 may a receiver only device, such as, for one example, a cellular base station receiver. Another example could be an alert device. The electronic device 205 may be an electronic device that has an associated transmitter, such as any type of personal two way communication device, including but not limited to cellular telephones, tables, and computers. The electronic device 205 may be operating at any radio carrier frequency. The receiver section 210 comprises an antenna 215 that intercepts RF energy and converts it to an RF signal 216 that is coupled to an RF amplifier 220 (e.g., a low noise RF amplifier). The RF signal 216 is amplified by the RF amplifier 220, generating an amplified RF signal 221 that is coupled to an RF demodulator 225. The RF demodulator uses a carrier signal 227 (which may be a quadrature signal) to demodulate the amplified RF signal 221, generating an RF demodulated signal 226 that includes sequential modulated resource blocks. The modulated resource blocks are such as those described above with reference to FIG. 1, but they have been altered by radio channel characteristics, inter-subcarrier interference, and noise.

The RF demodulated signal 226 is coupled to a channel estimator 230 and to a symbol recovery function 235. The channel estimator 230 and symbol recovery function 235 determine values 231 which characterize the modulated resource blocks currently being received by the receiver section 205. The values 231 may include the same information described above with reference to FIG. 1 and values 116. Using the values 231, the channel estimator 230 determines from stored data or by calculation one or more known pilot symbol sequences that are expected to be in each resource block. The channel estimator 230 uses the known pilot symbol sequences to determine one or more channel estimates 232 from the RF demodulated signal 226 corresponding to the one or more known pilot sequences in each sequential resource block. The pilot symbol sequences are pilot symbol sequences that have been determined in accordance with unique techniques described with reference to FIGS. 1 and FIGS. 8-18. The pilot symbol sequences that are being used may be determined from persistent memory within the electronic device 205, such as in a table, by using the values 231. The values 231 may be received in a control signal or may be determined from persistent memory within the electronic device, such as another table, using protocol identification received in a control signal. Alternatively, the pilot symbol sequences may be generated by the channel estimator function 230 or the data symbol recovery function 235 based on the values 231.

The symbol recovery function 235 uses the values 231 to characterize the resource blocks being received. The symbol recovery function 235 recovers the sequences of data symbols 236 from each sequential resource block using the characterization of the resource blocks (from the values 231) being received and the channel estimates made by the channel estimator 230 for each pilot sequence. This is done by an iterative process that removes adjacent subcarrier interference between adjacent data symbol modulated subcarriers, without having to re-calculate channel estimates made from the pilot symbol modulated subcarriers, because inter-subcarrier interference is avoided for pilot symbols, as described below. The recovered data symbols 236 may represent a wide variety of types of information, such as described above with reference to data symbol types in FIG. 1. In some embodiments, such as Multiple Input, Multiple Output (MIMO) embodiments, one or more modulated RF signals are simultaneously received from multiple antennas. The multiple modulated RF signals may comprise identical data symbols or differing data symbols, depending on the protocol (e.g., diversity reception versus spatial division reception). In these MIMO embodiments, the channel estimator uses the values 231 and the RF demodulated signals 226 to make channel estimates 232 for each pilot sequence in each simultaneously received resource block. The symbol recovery function 230 then recovers the data symbols 236 for each resource block of the MIMO transmission. Interference between pilot symbol sequences in simultaneously transmitted and received RF signals is avoided or minimized by techniques described below. In MIMO embodiments or single transmitter embodiments, one antenna may be used for both transmission and interception by included a duplexer per receive-transmit signal pair, as is known in the art.

Figure 3:
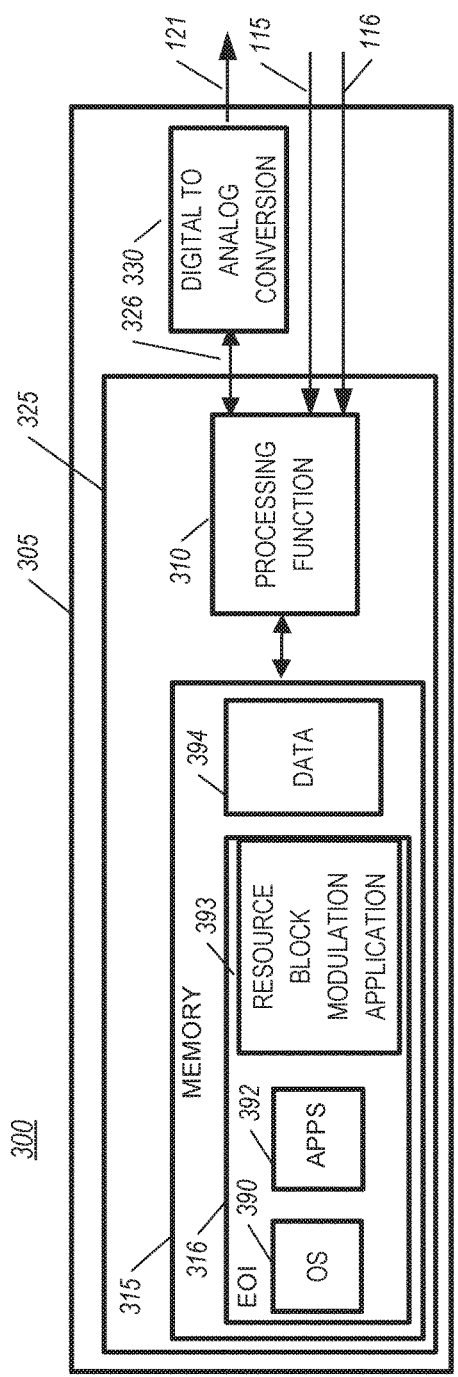
FIG. 3 is a hardware block diagram that shows a portion of an electronic device, in accordance with certain embodiments.

Referring to FIG. 3, a hardware block diagram 300 shows a portion of an electronic device 305, in accordance with certain embodiments. The electronic device 305 may be any of those described above with reference to FIG. 1. The portion of the electronic device 305 comprises a processing system 325, a digital-to-analog (D/A) converter 330, and among other things, receives the series of data symbols 115, receives the values 116, and generates a modulated resource block in signal 121 as described with reference to FIG. 1. The processing system 325 comprises a processing function 310 and memory 315. The processing function 310 comprises one or more processing devices (only one is shown in FIG. 3), each of which may include such sub-functions as central processing units (cores), cache memory, instruction decoders, just to name a few. The processing function 310 executes program instructions which may be located within memory in the processing devices or may be located in a memory 315 external to the processing function 310, to which the memory 315 is bi-directionally coupled, or in a combination of both. The memory 315 may be any combination of hardware that stores programming instructions, such as RAM, ROM, EPROM, EEPROM, and parts of an ASIC. The processing function 310 may, in some embodiments, be coupled to the D/A convertor 320 as a separate device, and is typically coupled to other functions of the electronic device not shown in FIG. 3.

The hardware block diagram 300 (FIG. 3) shows the executable operating instructions (EOI) 316 being stored in the memory 315, external to the processing function 310, but as noted above, the memory 315 may be within or shared with the one or more processing devices. The memory 315 also stores data 394. The EOI 316 of the electronic device 305 includes groups of instructions identified as an operating system (OS) 390, software applications 392 (including software utilities), and a software application called the resource block modulator 393. The applications 392 may include conventional radio applications and may include human interface applications. Examples of conventional radio applications include standby applications and radio control applications. Examples of human interface applications include display and keyboard applications, game applications, navigation application, video processing applications, and sensor processing applications. In some embodiments, the human interface applications are executed in a separate processing system. The processing function 310 includes input/output (I/O) interface circuitry (not explicitly shown) that is controlled by the processing function 310. The I/O circuitry is coupled to the signal 115 conveying the series of data symbols and may be coupled to the digital-to-analog (D/A) convertor 330 by signal 326. In some embodiments, the D/A convertor 330 is a portion of the processing function 310.

The processing system 325 runs the resource block modulation application 393, which performs the functions of the resource block modulator 120 (FIG. 1) of electronic device 105 (FIG. 1), except D/A conversion when a separate D/A convertor 330 is used. A first embodiment of the resource block modulator 120 comprises that portion of the processing system 325 necessary to perform the functions of the resource block modulator 120, and specifically includes the operating instructions of the resource block modulation application 393. A second embodiment of the resource block modulator 120 comprises the D/A convertor 330 and that portion of the processing system necessary to perform the remaining functions of the resource block modulator 120, and specifically includes the operating instructions of the resource block modulation application 393.

Figure 4:
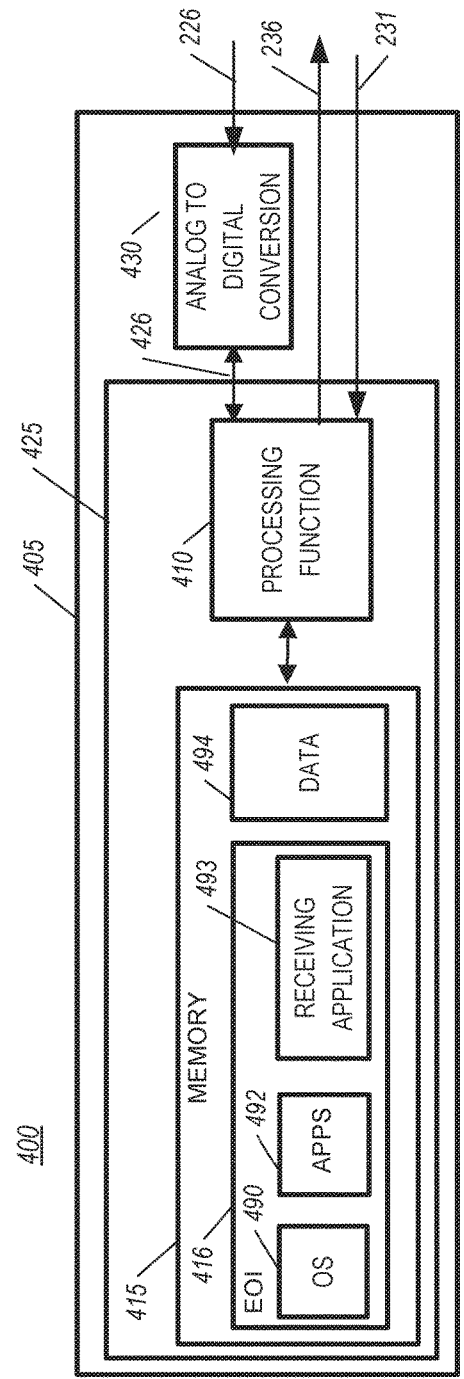
FIG. 4 is a hardware block diagram that shows a portion of an electronic device, in accordance with certain embodiments.

Referring to FIG. 4, a hardware block diagram 400 shows a portion of an electronic device 405, in accordance with certain embodiments. The electronic device 405 may be any of those described above with reference to FIG. 2. The portion of the electronic device 405 comprises a processing system 425, an analog-to-digital (A/D) converter 430, and among other things, receives a RF demodulated signal as signal 226, receives values 231, and generates recovered data symbols 236 as described with reference to FIG. 2. The processing system 425 comprises a processing function 410 and memory 415. The processing function 410 comprises one or more processing devices (only one is shown in FIG.

4), each of which may include such sub-functions as central processing units (cores), cache memory, instruction decoders, just to name a few. The processing function 410 executes program instructions which may be located within memory in the processing devices or may be located in a memory 415 external to the processing function 410, to which the memory 415 is bi-directionally coupled, or in a combination of both. The memory 415 may be any combination of hardware that stores programming instructions, such as RAM, ROM, EPROM, EEPROM, and parts of an ASIC. The processing function 410 may, in some embodiments, be coupled to the A/D convertor 420, and is typically coupled to other functions of the electronic device not shown in FIG. 4.

The hardware block diagram 400 (FIG. 4) shows the executable operating instructions (EOI) 416 being stored in the memory 415, external to the processing function 410, but as noted above, the memory 415 may be within or shared with the one or more processing devices. The memory 415 also stores data 494. The EOI 416 of the electronic device 405 includes groups of instructions identified as an operating system (OS) 490, software applications 492 (including software utilities), and a software application called the receiving application 493. The receiving application 493 comprises two sub-applications, a channel estimator application and a symbol recovery application. The applications 492 may include conventional radio applications and may include human interface applications. Examples of conventional radio applications include standby applications and radio control applications. Examples of human interface applications include display and keyboard applications, game applications, navigation application, video processing applications, and sensor processing applications. In some embodiments, the human interface applications are executed in a separate processing system. The processing function 410 includes input/output (I/O) interface circuitry (not explicitly shown) that is controlled by the processing function 410. The I/O circuitry is coupled to the RF demodulated signal 226 and may be coupled to the A/D convertor 430 by signal 426. In some embodiments, the A/D convertor 430 is a portion of the processing function 410.

The processing system 425 runs the receiving application 493, which performs the functions of the channel estimator function 230 (FIG. 2) and symbol recovery function 235 (FIG. 2) of electronic device 205 (FIG. 2), except A/D conversion when a separate D/A convertor 430 is used. A first embodiment of the channel estimator function 230 and symbol recovery function 235 comprises that portion of the processing system 425 necessary to perform the functions of the channel estimator function 230 and symbol recovery function 235, and specifically includes the operating instructions of the receiving application 493. A second embodiment of the resource block modulator 120 comprises the A/D convertor 430 and that portion of the processing system necessary to perform the remaining functions of the channel estimator function 230 and symbol recovery function 235, and specifically includes the operating instructions of the receiving application 493.

Figure 5:
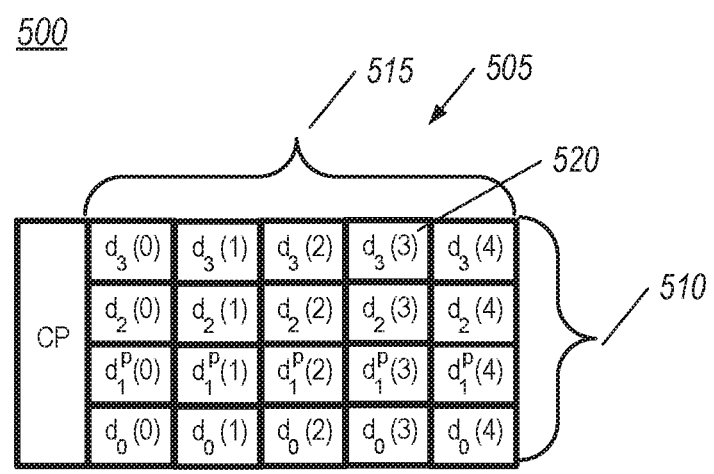
FIG. 5 is a time-frequency representation of one example of a small resource block, in accordance with certain embodiments.

Referring to FIG. 5, a time-frequency representation 500 of one example of a small resource block 505 is shown, in accordance with certain embodiments. The small resource block 505 shown in FIG. 5 has four subcarriers 510. The number of subcarriers 510 is identified as N in this document. In this example, N=4. The number of time slots 515 or symbol-block length in this document is indicated by M. In this example, M=5. Each resource element may be a pilot symbol or a data symbol. A set of multicarrier resource elements modulated on the N subcarriers is transmitted simultaneously in each time slot. Resource elements that are data symbols are designated as $d_n$ (i), whereas resource elements that are pilot symbols are designated as $d_n^P$(i). In these designations, $0 \leq n < N$ and $0 \leq i < M$. Resource element 520, $d_3$ (3), is specifically referenced in FIG. 5 as an example. In these representations, p indicates a pilot symbol, n indicates a specific subcarrier, and the i within $d_n$ (i) indicates a specific time slot. A lack of superscript indicates a data symbol. In the time period at the left of the representation, a block CP is identified. This is a representation of a cyclic prefix in the time domain of a certain duration (e.g., typically a fraction of the time slot duration) that precedes the M time slots or symbol-block in the time domain and is a replica of the samples at the end of symbol-block of duration equal to the cyclic prefix duration. In this small resource block 505 there is only one pilot sequence on one pilot subcarrier. The inclusion of one pilot sequence on one pilot subcarrier may be used in circumstances in which a channel estimate made by a receiver using the pilot symbols of the one pilot sequence on the pilot subcarrier is expected to characterize the channel for subcarriers 0, 2, and 3 sufficiently well to allow adequate recovery of all the data symbols in the resource block 505. This expectation may be based on several characteristics of the environment in which the resource block is transmitted, for example, the RF carrier frequency, the RF bandwidth (which is typically closely related to the sum of the bandwidths of the subcarriers), the nature of multipath in the RF channel, the filter characteristics of the subcarrier filters, etc. In large resource blocks, a multiplicity of pilot symbol sequences or pilot subcarriers may be used. In some embodiments, location or position of the pilot subcarrier(s) on different resource blocks may be different. In some embodiments, location or position of pilot subcarrier(s) of a resource block of a first symbol-block may be different than the location or position of pilot subcarrier(s) of the resource block of a second symbol-block. The location or position of pilot subcarrier(s) may be determined by a predetermined hopping sequence which may be based on an Identity of an electronic device or an Identity signaled by an electronic device.

Figure 6:
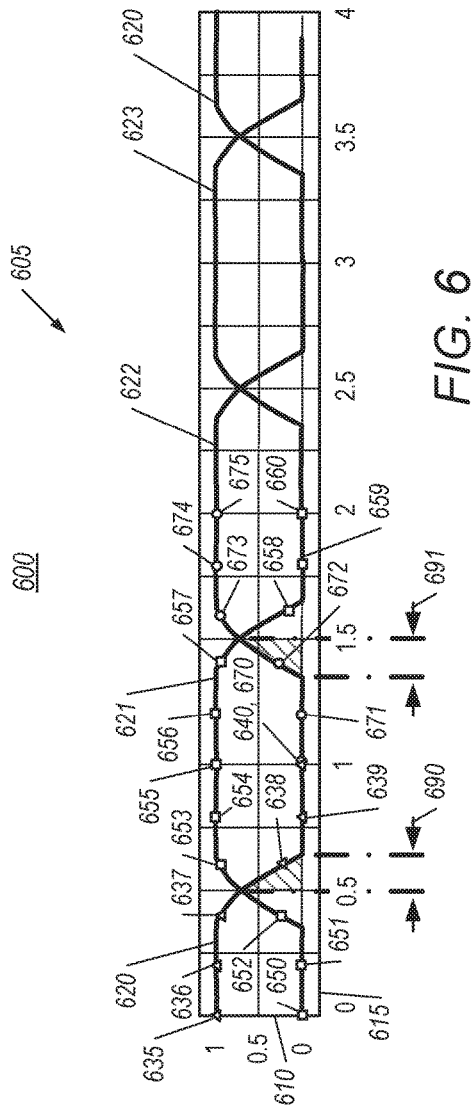
FIG. 6 is a frequency plot that shows subcarrier filter gain characteristics and digital sample magnitudes at discrete sampling points of a modulated resource block, in accordance with an embodiment.

Referring to FIG. 6, a frequency plot 605 shows subcarrier filter gain characteristics and digital sample magnitudes at discrete sampling points of a modulated resource block that has been generated using a Discrete Fourier Transform, in accordance with an embodiment. The gain axis 610 shows subcarrier filter gains normalized to a maximum value of 1. The frequency axis 615 shows frequencies normalized to a frequency equal to one subcarrier bandwidth or subcarrier spacing. This embodiment is presented to show problems solved with other embodiments described below. In this example, the N and M values for the resource block are the same as described with reference to FIG. 5, i.e., N=4 and M=5. For clarity and simplicity, in this example all data and pilot frequency domain samples are assumed to have had a magnitude of 1 prior to modulation and filtering. The subcarrier filters have gain characteristics 620-623 in this example and are identical for all subcarriers, are circular filters, and are root-raised cosine filters (with excess bandwidth factor or rolloff factor α=0.3), which provides pulse shaping approximately as shown in FIG. 6, and use an upconversion factor of two. The filter having gain characteristic 620 is a filter for 5 filtered frequency domain samples 635-639 of the 10 upconverted filtered frequency domain samples $r_0$ (i), $0 \leq i < 10$ of a data resource element sequence, $d_0$ (i), $0 \leq i < 5$. The filter having gain characteristic 621 is a filter for the 10 upconverted filtered frequency domain samples 650-659, $r_1^P(i)$, $0 \le i < 10$, of a pilot resource element sequence, $d_1^P(i)$, $0 \le i < 5$. The filter having gain characteristic 622 is a filter for 5 filtered frequency domain samples 670-674 of the 10 upconverted filtered frequency domain samples $r_2(i)$, $0 \le i < 10$ of a data resource element sequence, $d_2(i)$, $0 \le i < 5$. Five filtered sample values for the first and third subcarrier resource element sequences and all filtered data samples for the fourth subcarrier resource element sequence are not shown, for simplicity and clarity.

It will be appreciated that the sample values generated as signal 326 (FIG. 3) are combined values that are the weighted sum of the values of the filtered symbols occurring from subcarriers at a same sample time. The frequency domain representation of the signal 326 comprises samples that are combined values of the sum of the values of the filtered samples occurring from adjacent subcarrier. For some frequency-domain samples, the combined value is equal to the value of only one of the two filtered samples because the other filtered sample has a value of zero due to filtering. However, there are regions of excess bandwidth, $\alpha$, which is a measure of excess bandwidth of the subcarrier filter, of which two excess bandwidth regions 690, 691 are shown in FIG. 6. The excess bandwidth regions 690, 691 are the regions of a filter gain characteristic beyond the Nyquist bandwidth of half symbol rate (i.e., half subcarrier spacing) to a frequency at which the gain reaches zero or an insignificant value. In the present case of adjacent subcarrier filters, the subcarrier filters are arranged such that the Nyquist bandwidth edges of two adjacent filters are at a boundary frequency. The excess bandwidth of a filter is quantified herein as a fraction, $\alpha$, of the excess bandwidth of the filter to the Nyquist bandwidth. It will be appreciated that the total value of a sample that falls within this excess bandwidth region is the sum of the filtered sample values from two resource element sequences; for example, one being a data symbol sequence on subcarrier n=0 and the other (subcarrier n=1) being a pilot symbol sequence. This overlap between the adjacent subcarrier filters contributes to the amounts of inter-subcarrier interference between the data symbol sequence and pilot symbol sequence.

If this set of transmitted sample values were received by a receiver, the receiver would be attempting to recover a pilot symbol sequence that has interference from data symbol sequence(s) from adjacent subcarrier(s). This makes the process of reception complex, because an iterative process must be used to derive a first pass estimate of the channel characteristics using samples of the received pilot symbol sequence and the known pilot symbol sequence on the pilot subcarrier, which gives an incorrect estimate of the channel characteristics because of the interference, in addition to the noise. The incorrect estimated channel characteristic may then be used to recover the data symbol sequence(s) that are interfering with the pilot symbol sequence. The recovered data symbol sequence may be incorrect due to the incorrect channel estimate and noise. The recovered data symbol sequence may then be used to remove the data subcarrier interference from the pilot subcarrier using the known subcarrier filter characteristics. This improves the quality of the received pilot symbol sequence and in turn improves the channel estimate which is based on the improved (interference-reduced) pilot symbol sequence. This process may be iterated as much as needed to achieve a desired pilot symbol sequence quality, but the resulting data symbol error rate may still be higher than desired and the recovery of the channel estimate is complicated and therefore resource consuming.

In some embodiments a general expression for the signal 121 (FIG. 1) for a pilot sample sequence $r_n^P(i)$ for subcarrier $n \in \{1, \ldots, N\}$ is given in equation (2), which is derived from a Discrete Fourier Transform of equation (1):

$$r_n^P(i) = (P^{(n-1)} \Gamma_{Tx}^{(L)} R^{(L)} W_M d_{n-1} + P^{(n)} \Gamma_{Tx}^{(L)} R^{(L)} W_M d_n + P^{(n+1)} \Gamma_{Tx}^{(L)} R^{(L)} W_M d_{n+1}) \quad (2)$$

In equation (2) $i = \{nM+l\}$, $l \in \{-M, M-1\}$, $R^{(L)} = \{I_M, I_M, \ldots, I_M\}^T$, $$W_\upsilon = \frac{1}{\sqrt{\upsilon}} \{w^{n,m}\} \upsilon \times \upsilon,$$

$$W^{n,m} = e^{-j 2\pi \frac{(n-1)(m-1)}{\upsilon}},$$

$\Gamma^{(L)} = W_{LM} g^{(L)}$, $I_M$ is an Identity matrix of size M, L is the upconversion factor (in our example L=2), $W_\upsilon$ is a DFT-matrix of size $\upsilon$, $g^{(L)}$ is the down-sampled (by factor N/L) version of the filter coefficient g, and $P^{(n)}$ is a permutation matrix for up-converting the $n^{th}$ sub-carrier to its respective sub-carrier frequency. The coherence time of the channel is preferably at least the resource symbol-block length such that the channel can be assumed to be constant over the symbol-block. From this equation, it can be seen that the ten samples for each subcarrier are a sum of values related to the subcarrier and adjacent subcarriers. In FIG. 6, the values 639, 640, 670, 671, which are samples for the adjacent channels, have insignificant magnitudes due to filtering, so in this embodiment there are four sample times at which non-zero values would be added together by equation (2) to get the sample values that occur in signal 326. The sample pairs that are added together at these four sample times are (637, 652), (638, 653), (657, 672), and (658, 673).

Figure 7:
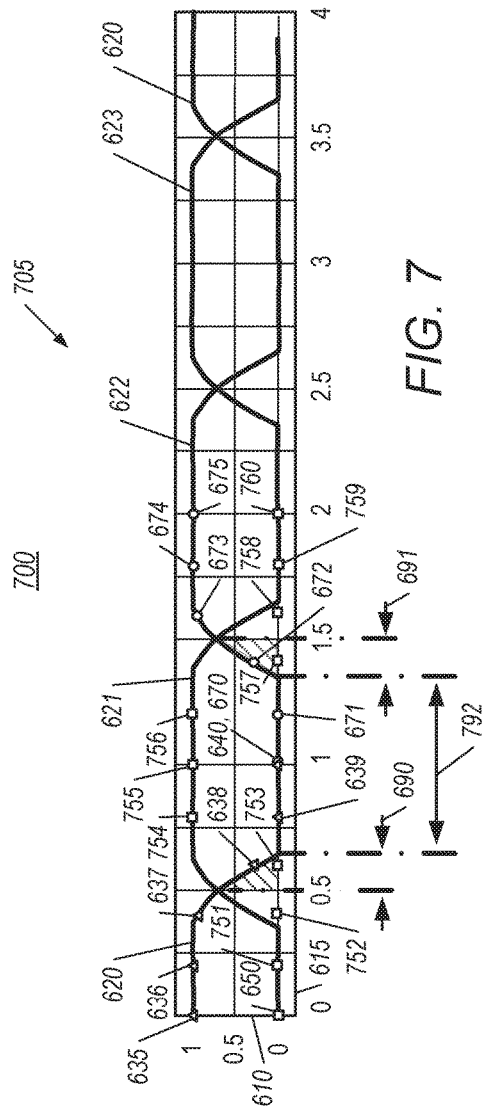
FIG. 7 is a frequency plot that shows subcarrier filter gain characteristics and digital sample magnitudes at discrete sampling points of a modulated resource block that has been generated using a discrete Fourier transform, in accordance with some embodiments.

Referring to FIG. 7, a frequency plot 705 shows subcarrier filter gain characteristics and digital sample magnitudes at discrete sampling points of a modulated resource block that has been generated using a Discrete Fourier Transform, in accordance with some embodiments. The gain axis 610 and frequency axis 615 are the same as in FIG. 6. In this example, the subcarrier filters are identical to those described with reference to FIG. 6. The N and M values for the resource block are the same as described with reference to FIG. 5, i.e., N=4 and M=5. For clarity and simplicity, in this example all non-zero magnitude data and pilot frequency domain samples are shown as if they had magnitude of 1. This is not the actual situation, as will be made clear below. A significant difference between these embodiments and the embodiment described with reference to FIG. 6 is that the only pilot frequency domain samples having non-zero values before filtering are determined such that they are in the region 792 of the pilot subcarrier filter gain characteristic 621 that is between the defined minimum thresholds of the excess bandwidths 690, 691 of the adjacent subcarrier filters. In the example being used, the pilot sample sequence $r_n^P$, (n=1) has non-zero magnitude samples only for pilot samples $r_n^P(1)$, $4 \le i \le 6$, identified in FIG. 7 as pilot samples 754, 755, 756. All other pilot samples, $r_n^P(1)$, $0 \le i \le 3$ and $r_n^P(1)$, $7 \le i \le 9$, which are identified in FIG. 7 as 750, 751, 752, 753 and 757, 758, 759, have zero magnitude prior to filtering. The filtered sample values of the data samples in the adjacent subcarriers have the same values as shown in FIG. 6. As a result of the constraint that the only pilot frequency domain samples having non-zero values before filtering are not within the excess bandwidth regions, it will be appreciated that the pilot time domain symbol sequence incurs no interference from adjacent subcarrier data or pilot symbol sequence in the same resource block. This constraint may be achieved in some embodiments as described in the following techniques.

Figure 8:
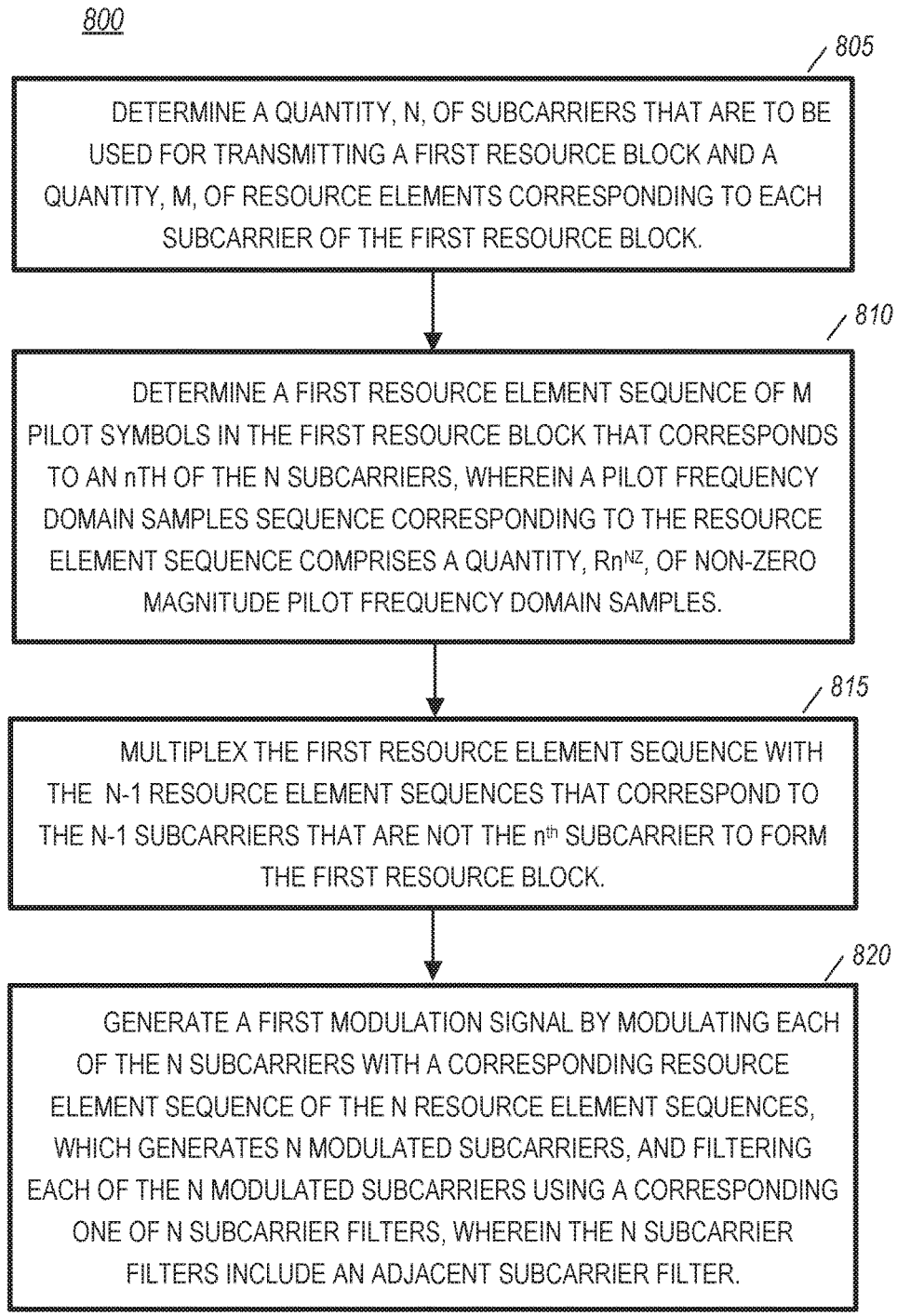
FIG. 8 is a flow chart that shows some steps of a method for generating a modulation signal, in accordance with some embodiments.

Referring to FIG. 8, a flow chart 800 of some steps of a method for generating a modulation signal is shown, in accordance with some embodiments. The modulation signal is one such as signal 121 (FIG. 1), generated by an electronic device such as electronic device 105 (FIG. 1). At step 805, a quantity, N, of subcarriers that are to be used for transmitting a first resource block and a quantity, M, of resource elements corresponding to each subcarrier of the first resource block are determined. The first resource block comprises the N subcarriers and M multicarrier symbols, and can be used to modulate a radio frequency (RF) carrier. In this context, "first" simply serves to distinguish one resource block from another, not to identify a relative time of occurrence of the resource block. A multicarrier symbol comprises N symbols of the same time slot (one or more of which may be pilot symbols). A first resource element sequence, $M_n^P$, of M pilot symbols is determined at step 810 in the first resource block that corresponds to an $n^{th}$ of the N subcarriers. A pilot frequency domain sample sequence, $r_n^P$, corresponding to the resource element sequence $M_n^P$ comprises a quantity, $R_n^{NZ}$, of non-zero magnitude pilot frequency domain samples. $R_n^{NZ}$ is determined based on M and an excess bandwidth, $\alpha$, of an adjacent subcarrier filter. The adjacent subcarrier filter is one that is used to filter a modulated subcarrier that is adjacent to the $n^{th}$ subcarrier within the first resource block. The first resource element sequence $M_n^P$ is multiplexed at step 815 with the N−1 resource element sequences that correspond to the N−1 subcarriers that are not the $n^{th}$ subcarrier, to form the first resource block. At step 820 a first modulation signal is generated by modulating each subcarrier of the N subcarriers with a corresponding resource element sequence of the N resource element sequences. This generates N modulated subcarriers. Each of the N modulated subcarriers is filtered using a corresponding one of N subcarrier filters, wherein the N subcarrier filters include the adjacent subcarrier filter. In some embodiments, a second resource block is modulated with a different multi-carrier transmission scheme (e.g., OFDM of SC-FDM). In some embodiments, one or more guard (or null) subcarriers may be introduced between adjacent resource blocks. This may help to reduce the interference between adjacent resource blocks. In some embodiments, the guard (or null) subcarriers may be created by setting the value of the resource element sequence of an edge subcarrier of one or more resource blocks to zero or null. In some embodiments, a first device is allocated a first set of contiguous resource blocks and a second device is allocated a second set of contiguous resource blocks adjacent to the first set of contiguous resource blocks, and one or more guard (or null) subcarriers are introduced at the boundary between the first set of contiguous resource blocks and second set of contiguous resource blocks. The guard (or null) subcarriers may be edge subcarrier corresponding to the boundary resource block(s) of the first device and second device resource allocation.

The $R_n^{NZ}$ non-zero magnitude pilot frequency domain samples may not be within any excess bandwidth region of the subcarrier and are equally spaced about the center of the bandwidth of the subcarrier. The $R_n^{NZ}$ non-zero magnitude pilot frequency domain samples are contiguous in frequency. The values of the time domain pilot signal corresponding to the $n^{th}$ subcarrier of the first modulation are independent of the values of data symbols in adjacent subcarriers.

The time domain pilot symbols are symbols for which the $R_n^{NZ}$ non-zero magnitude pilot frequency domain samples meet the stated constraints (the number of non-zero pilot frequency domain samples is determined based on combinations of M and $\alpha$). The time domain pilot symbols may be obtained by first forming the complete pilot frequency domain sample sequence $r_n^P$ by zero padding the $R_n^{NZ}$ non-zero magnitude pilot frequency domain samples by a quantity $R_n^Z$ of zero magnitude pilot frequency domain samples. In an example in which the subcarrier filter span is characterized over two subcarrier spans corresponding to an upconversion factor of two, $R_n^Z = 2 \cdot M − R_n^{NZ}$. The zero padded pilot sample sequence may then be transformed by an inverse Discrete Fourier Transform, which may be performed in some embodiments as an Inverse Fast Frequency Transform, to generate the pilot symbol sequence, $M_n^P$. In some embodiments this process to determine the time domain pilot symbols may be carried out during a design phase for all expected combinations of M, N, and $\alpha$ at the time of design of a protocol and the results stored as a look up table. The determination of the pilot symbols may then be accomplished in an electronic device 105 by determining a set of M and $\alpha$ values for a particular transmission, and using the look up table to determine the pilot symbols. The pilot symbols may then be used to perform the multiplex operation to assemble all the symbols for a resource block. This technique provides a common procedure to prepare the modulation signal 121. This is an efficient process for generating resource blocks that have pilot sequences that have reduced or no inter-subcarrier interference. In contrast, it will be appreciated that the modulated values of signal 121 within any subcarrier that is not a pilot subcarrier is dependent on resource element sequence values (such as symbol values) in adjacent subcarriers (if any) that are not pilot subcarriers, due to the subcarrier filters. Alternatively, the electronic device may determine the pilot symbol sequence by making a determination of the values of M and $\alpha$, and determining the value $R_n^{NZ}$ therefrom using any method, such as a graphical method or any one of several techniques described herein, to establish values for each of the $R_n^{NZ}$ samples, such as heuristically or by any one of several techniques described herein below, and performing an Inverse Discrete Fourier Transform to generate the pilot symbols.

In some embodiments, the subcarrier filters have identical gain and bandwidth characteristics. In some embodiments, the filters are root-raised cosine filter (for example with excess bandwidth factor, or roll-off factor $\alpha=0.3$). In some embodiments, the filter characteristics, including excess bandwidth, and the values of M and N are determined by the selection of a particular protocol, which may be influenced by information from a network controlling device and/or information determined by the electronic device. For example, the type of data to be communicated influences the values M and N. The bandwidth resources that are available for a particular session or message may influence the number of subcarriers, N, and may influence the subcarrier bandwidth and subcarrier filter characteristics. The value of M may be based on the amount of data that is in a particular message or data packet. The complete time domain signal (signal 121, FIG. 1) is the summation of all pilot (and data) signals on the different subcarriers. The summation is typically performed in the discrete time domain, so that signal 326, FIG. 3, may also be considered to the summation of the time domain signals.

Referring to FIG. 9, a flow chart 900 shows a step of the method that may be used in the method for generating a modulation signal that is described above with reference to FIG. 8, in accordance with some embodiments. At step 905, filtering each of the N modulated subcarriers (step 820, FIG. 8) comprises circularly filtering each modulated subcarrier using the corresponding one of the N subcarrier filters.

Referring to FIG. 10, a flow chart 1000 shows a step of the method that may be used in the method for generating a modulation signal that is described above with reference to FIG. 8, in accordance with some embodiments. In embodiments in which all subcarrier filters are identical and the subcarrier filters are characterized over two subcarrier spans, $R_n^{NZ}$ may be determined (step 810, FIG. 8) as $$R_n^{NZ} = 2\left(M - 1 - \left\lfloor \frac{M}{2}(1+\alpha) \right\rfloor\right) + 1.$$

For embodiments in which the subcarrier filters do not have equivalent excess bandwidths for the two adjacent subcarrier filters, the formula would be based on the values for α for the subcarrier filters (i.e., subcarrier filter for subcarrier of interest, and adjacent subcarrier filters). In one example in which M=5 and α=0.3, $R_n^{NZ}=3$.

Referring to FIG. 11, a flow chart 1100 shows a step of the method that may be used in the method for generating a modulation that is described above with reference to FIG. 8, in accordance with some embodiments. At step 1105, the pilot frequency domain sequence $r_n^P$ is formed that comprises the $R_n^{NZ}$ non-zero magnitude pilot frequency domain samples mapped as contiguous frequency samples corresponding to the frequency samples close to the center of the pilot subcarrier and a quantity, $R_n^Z$, of zero magnitude pilot frequency domain samples that is determined based on a subcarrier filter rolloff factor and M. A method of determining $R_n^Z$ is described above with reference to FIG. 8. The frequency samples encompassing the center frequency sample of the pilot subcarrier may comprise equally spaced frequency samples that in some embodiments with an odd number of frequency samples have equal number of frequency samples on both upper and lower frequency portions around the center frequency sample and in other embodiments with an even number of frequency samples have unequal number of frequency samples (difference of one sample) on the upper and lower frequency portions around the center frequency sample of the pilot subcarrier. The zero magnitude frequency samples may be distributed equally or unequally (e.g., difference of one sample) outside of the non-zero magnitude frequency samples.

Figure 12:
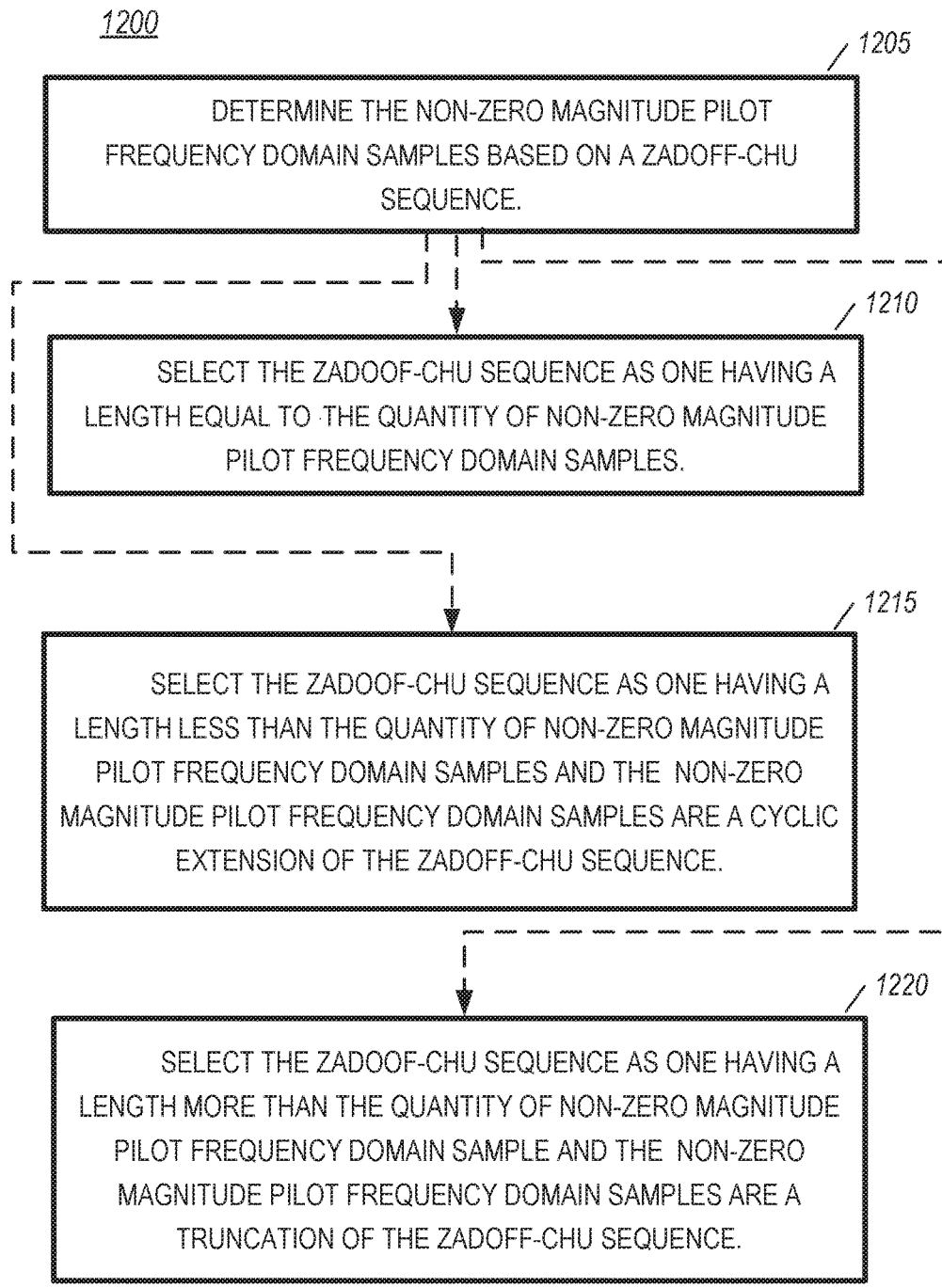

Referring to FIG. 12, a flow chart 1200 shows some steps that may be used in step 810 of the method for generating a modulation signal described above with reference to FIG. 8, in accordance with some embodiments. At step 1205, the $R_n^{NZ}$ non-zero magnitude pilot frequency domain samples are determined based on a Zadoff-Chu sequence of length L and base u. A Zadoff-Chu sequence, $x_u(m)$, of length L and base u can be given as, $$x_u(m) = \exp\left(-j\pi u \frac{m(m+1)}{L}\right),$$

m=0, 1, 2, ..., L−1 (1≤u≤L−1). At optional step 1210, in some embodiments, L=$R_n^{NZ}$ and base u is relatively prime with respect to L. In some embodiments, the Zadoff-Chu sequences are determined using a base that is relatively prime with reference to $R_n^{NZ}$. At step 1215, the Zadoff-Chu sequence in some embodiments has a length less than $R_n^{NZ}$ (e.g., the Zadoff-Chu sequence length L is given by the largest prime number such that L<$R_n^{NZ}$) and the $R_n^{NZ}$ non-zero magnitude pilot frequency domain samples are a cyclic extension of the Zadoff-Chu sequence, $x_u$(n mod L), 0≤n<$R_n^{NZ}$. At step 1220, in some embodiments the Zadoff-Chu sequence has a length more than $R_n^{NZ}$ (e.g., the Zadoff-Chu sequence length L is given by the smallest prime number such that L>$R_n^{NZ}$) and the $R_n^{NZ}$ non-zero magnitude pilot frequency domain samples are a truncation of the Zadoff-Chu sequence ($x_u$(n), 0≤n<$R_n^{NZ}$). It will be appreciated that the Inverse Discrete Fourier Transform of a Zadoff-Chu sequence of length L results in a sequence of time symbols of constant amplitude, and for which cyclical shifts of the pilot time symbols or pilot frequency domain samples are orthogonal, respectively, to other shifts. Cyclic extension and truncation somewhat degrades these aspects. Zadoff-Chu is alternatively designated ZC in this document.

In some embodiments, the $R_n^{NZ}$ non-zero magnitude pilot frequency domain samples are determined based on a predetermined QPSK (Quadrature Phase Shift Keying) modulation sequence. In some embodiments, the $R_n^{NZ}$ non-zero magnitude pilot frequency domain samples are scrambled by a pseudo-random scrambling sequence. The pseudo-random scrambling sequence may be based on an Identity of an electronic device or an Identity signaled by an electronic device. The pseudo-random scrambling sequence may be a complex scrambling sequence such as a QPSK scrambling sequence with in-phase and quadrature-phase sequences based on a real valued pseudo-random sequence, for example, determined from a PseudoNoise (PN) sequence or Gold sequence generator.

One consequence of forming pilot symbol sequences with the type of shaping of the pilot signal in frequency domain describe herein (i.e., the quantity of non-zero frequency domain samples $R_q^{NZ}$ is less than M) for a smaller number of non-zero frequency domain samples than M, is that it is possible that the signals on different time slots ($d^P$(i), 0≤i≤M−1) have different powers. For instance, for a selected frequency response of a length-5 symbol-block (M=5) for which $R_q^{NZ}=3$, wherein a first value for the base u of a Zadoff-Chu sequence is used, a scaled $r_u^P$(n)=(1.291, −0.645−1.118i, 1.291). In the time domain, $d^P$(n)=(0.8660−0.5000i, 0.2388+0.4446i, −0.8534+1.0085i, 0.0976−1.3175i, −0.3490+0.3645i). So, the corresponding power of each time slot of the length-5 symbol-block would be (1, 0.504, 1.32, 1.32, 0.504). As can be seen, although the total power (in time) is the same as the power that exists for data subcarriers, it is not constant over different time-slots. To reduce or remove this time dependency when multiple pilot signals are used (e.g., in a resource block, or across resource blocks) an appropriate phase shift may be applied to the $r_u^P$(n) such that for different pilot subcarriers a time-shifted version of the time-domain representation of the original pilot signal are generated, i.e.:

$$d_u^P = \eta \times \mathbb{F}_u^{(\beta,n)}(1:2:2M) \tag{3}$$

In equation (3), η is a normalization factor to compensate for the zero-padding in the frequency domain, and $\mathbb{F}_u^{(\beta,n)}$(n)=IFFT ($e^{-jn k}r_u^P$(n)) with a cyclic shift of β. For instance, as for the above example, equation (3) gives the following pilot sequences:

$d_1^P$=Seq1=(0.86−0.50i,0.23+0.44i,−0.85+1.00i,0.09−1.31i,−0.34+0.36i)

$d_2^P$=Seq2=(−0.34+0.36i,0.86−0.50i,0.23+0.44i,−0.85+1.00i,0.09−1.31i)

$d_3^P$=Seq3=(0.09−1.31i,−0.34+0.36i,0.86−0.50i,0.23+0.44i,−0.85+1.00i)

$d_4^P$=Seq4=(−0.85+1.00i,0.09−1.31i,−0.34+0.36i,0.86−0.50i,0.23+0.44i)

$d_5^P$=Seq5=(0.23+0.44i,−0.85+1.00i,0.09−1.31i,−0.34+0.36i,0.86−0.50i)

$d_6^P$=Seq6=(0.86−0.50i,0.23+0.44i,−0.85+1.00i,0.09−1.31i,−0.34+0.36i)=$d_1^P$

Seq7=one shift to the right of Seq6
Seq8=so on . . . .

With this time shift and since the complete time domain signal is the summation of all pilot (and data) signals on different subcarriers, the average power over different timeslots would be almost equal to each other and large power variations will not occur between time samples of the symbol-block. Some steps for achieving this are described with reference to FIGS. 13-14.

Referring to FIG. 13, a flow chart 1300 shows some steps that may be used in the method for generating a modulation signal that is described above with reference to FIG. 8, in accordance with some embodiments. At step 1305, a second resource element sequence, $M_q^{p:\theta S}$, of M pilot symbols that form a $q^{th}$ of the N subcarriers is determined, wherein q≠n, and wherein pilot frequency domain samples, $r_q^P(i)$, 0<i<M−1, of the $q^{th}$ subcarrier corresponding to the second resource element sequence $M_q^{p:\theta S}$ are each determined as at least a phase shift, θ(i), of the corresponding pilot frequency domain samples, $r_n^P(i)$, 0<i<M−1, of the $n^{th}$ subcarrier, and wherein θ(i)=Q·i, and wherein Q is a phase constant. The phrase "at least" is used because other techniques that are described below could be combined with this one to alter the values of the pilot symbols of the first resource element sequence. The second resource element sequence $M_q^{p:\theta S}$ is multiplexed, at step 1310, with the N−1 resource element sequences that correspond to the N−1 subcarriers that are not the $q^{th}$ subcarrier, to form the first resource block. (Note that the first resource element sequence $M_n^P$ has already been multiplexed in step 815 described above with reference to FIG. 8). The phrase "at least" is used because other techniques that are described below could be combined with phase shifting to obtain the values of the pilot symbols of the second resource element sequence. It will be appreciated that using one or more versions of a pilot frequency domain samples sequence (for example by applying a phase shift) typically reduces the amount of amplitude variation of the modulated resource block signal.

Referring to FIG. 14, a flow chart 1400 shows some steps that may be used in the method for generating a modulation signal that is described above with reference to FIG. 8, in accordance with some embodiments. At step 1405, a second resource element sequence, $M_q^{p:TS}$ of M pilot symbols that form the resource elements for a $q^{th}$ one of the N subcarriers of the first resource block is determined, wherein q≠n, and wherein the pilot symbols, $d_q^P(i)$, 0<i<M−1, of the $q^{th}$ subcarrier are each determined as a cyclical time shift of the pilot symbols, $d_n^P(i)$, 0<i<M−1, of the $n^{th}$ subcarrier. At step 1410, the second resource element sequence $M_q^{p:TS}$ is multiplexed with the N−1 resource element sequences that correspond to the N−1 subcarriers that are not the $q^{th}$ subcarrier, to form the first resource block. (Note that the first resource element sequence $M_n^P$ has already been multiplexed in step 815 described above with reference to FIG. 8). It will be appreciated that these embodiments are equivalent to the embodiments described above with reference to FIG. 13, when an appropriate phase shift constant Q is chosen.

Referring to FIG. 15, a flow chart 1500 shows some steps that may be used in the method for generating a modulation signal that is described above with reference to FIG. 8, in accordance with some embodiments. At step 1505, a second resource element sequence, $M_q^{p:CS}$, of M pilot symbols that correspond to a $q^{th}$ of N subcarriers of a second resource block is determined. The subcarriers and subcarrier filters of the second resource block may have the same characteristics of the subcarriers and subcarrier filters used for the first resource block. The pilot subcarrier, q, of the second resource block may be the same as the pilot subcarrier, n, used for the first resource block. A pilot frequency domain samples sequence, $r_q^{p:CS}$, corresponding to the second resource element sequence $M_q^{p:CS}$, comprises $R_q^{NZ}$ non-zero magnitude pilot frequency domain samples. $R_q^{NZ}$=$R_n^{NZ}$. The $R_q^{NZ}$ non-zero magnitude pilot frequency domain samples of the pilot frequency domain samples sequence $r_q^{p:CS}$ of the second resource block are determined as cyclical shifts of the respective $R_n^{NZ}$ non-zero magnitude pilot frequency domain samples of the pilot frequency domain samples sequence $r_n^P$ of the first resource block. Note that q may be any value from 0 to N−1, including n. At step 1510, the second resource element sequence $M_q^{p:CS}$ is multiplexed with the N−1 resource element sequences that correspond to the N−1 subcarriers that are not the $q^{th}$ subcarrier, to form the second resource block. At step 1515, a second modulation signal is generated by modulating each subcarrier with a corresponding resource element sequence of the second resource block, which generates N modulated subcarriers of the second resource block, and filtering each of the N modulated subcarriers of the second resource block using a corresponding one of N subcarrier filters. It will be appreciated that this technique can be extended to more than two resource element sequences of M pilot symbols.

Figure 16:
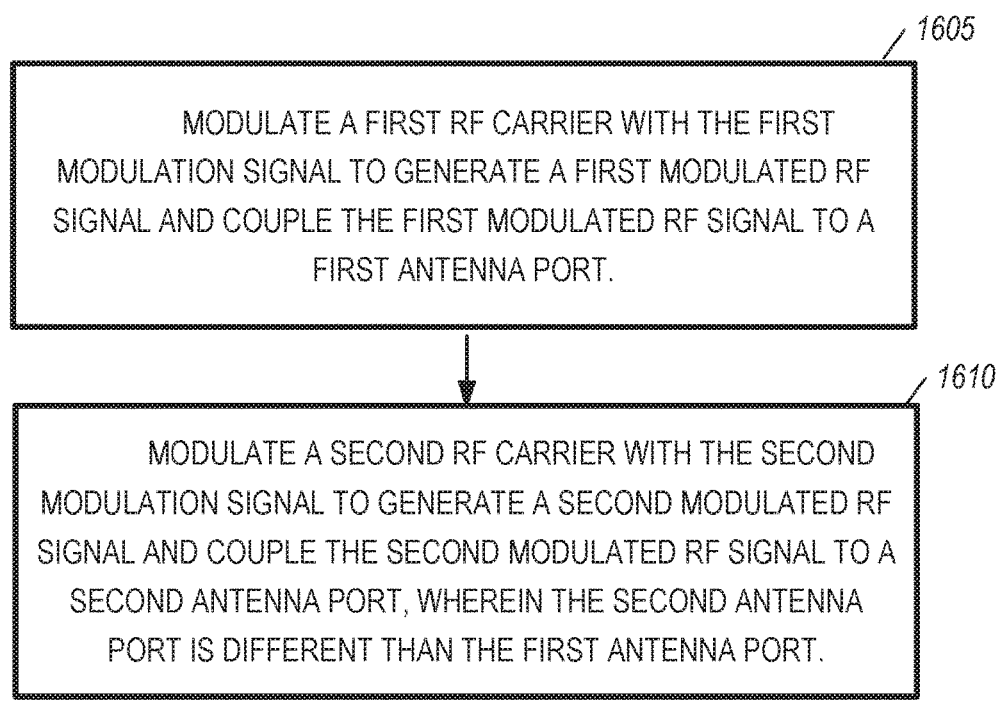
FIG. 16 is a flow chart that shows some additional steps of the method for generating a modulation signal described with reference to FIG. 15, in accordance with some embodiments.

Referring to FIG. 16, a flow chart 1600 shows some additional steps of the method for generating a modulation signal described above with reference to FIG. 15, in accordance with some embodiments. At step 1605, a first RF carrier is modulated with the first modulation signal to generate a first modulated RF signal. The first modulated RF signal is coupled to a first antenna port. At step 1610, a second RF carrier with the second modulation signal to generate a second modulated RF signal. The second modulated RF signal is coupled to a second antenna port, wherein the second antenna port is different than the first antenna port. The first and second modulation RF signals may be transmitted simultaneously, in synchronism. An "antenna port" according to certain embodiments may be a logical port that may correspond to a beam (resulting from beam forming) or may correspond to a physical antenna at an electronic device. An antenna port can be defined such that the channel over which a symbol on the antenna port is conveyed can be inferred from the channel over which another symbol on the same antenna port is conveyed. In some embodiments, a physical antenna may map directly to a single antenna port, in which case an antenna port corresponds to an actual physical antenna. Alternately, a set or subset of physical antennas, or antenna set, may be mapped to one or more antenna ports after applying complex weights, a cyclic delay, or both to the signal on each physical antenna. The physical antenna set may have antennas from a single electronic device or from multiple electronic devices. The weights may be fixed as in an antenna virtualization scheme, such as cyclic delay diversity (CDD). The pilot signals associated with an antenna port may be specific or common to all destination devices. The procedure used to derive antenna ports from physical antennas may be specific to an electronic device implementation and transparent to other electronic devices. In accordance with some embodiments, the first antenna port and the second antenna port may be quasi-located such that the large-scale properties of the channel over which a symbol on first antenna port is conveyed can be inferred from the channel over which a symbol on the second antenna port is conveyed. The large-scale properties can include one or more of delay spread, Doppler spread, Doppler shift, average gain, and average delay.

Referring to FIG. 17, a flow chart 1700 shows some steps that may be used in the method for generating a modulation signal described above with reference to FIG. 8, in accordance with some embodiments. At step 1705, a second resource element sequence, $M_q^{p:U}$, of M pilot symbols that correspond to a $q^{th}$ of N subcarriers of a second resource block is determined. The pilot subcarrier, q, of the second resource block may be the same as the pilot subcarrier, n, used for the first resource block. A pilot frequency domain samples sequence, $r_q^{p:U}$, corresponding to the second resource element sequence $M_q^{p:U}$, comprises $R_q^{NZ}$ non-zero magnitude values. $R_q^{NZ} = R_n^{NZ}$. The $R_n^{NZ}$ non-zero magnitude pilot frequency domain samples of the pilot frequency domain samples sequence $r_n^p$ are based on a first Zadoff-Chu sequence having a first base. The $R_q^{NZ}$ non-zero magnitude pilot frequency domain samples of the pilot frequency domain samples sequence $r_q^{p:U}$ are based on a second Zadoff-Chu sequence having a second base, preferably of the same length as the first ZC sequence. Note that q may be any value from 0 to N−1, including n, and the first base is different than the second base. At step 1710, the second resource element sequence $M_q^{p:U}$ is multiplexed with the N−1 resource element sequences that correspond to the N−1 subcarriers that are not the $q^{th}$ subcarrier to form the second resource block. At step 1715, a second modulation signal is generated by modulating each subcarrier with a corresponding resource element sequence of the second resource block, which generates N modulated subcarriers, and filtering each of the N modulated subcarriers using a corresponding one of N subcarrier filters.

Figure 18:
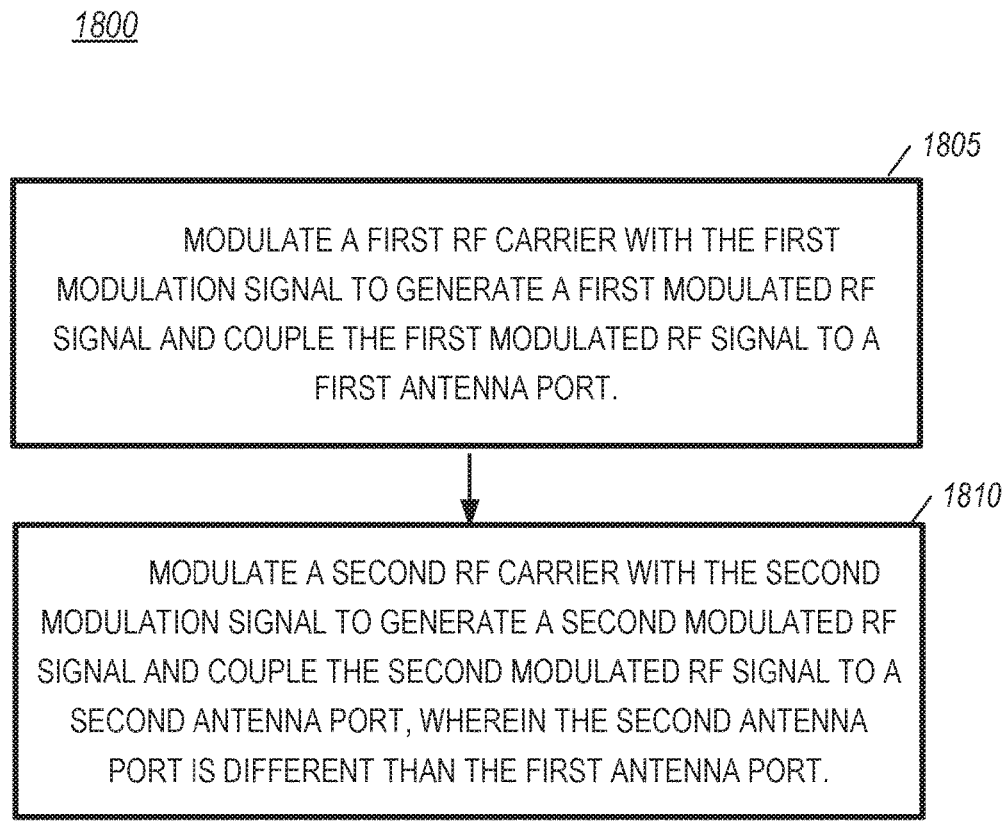
FIG. 18 is a flow chart that shows some additional steps of the method for generating a modulation signal described with reference to FIG. 17, in accordance with some embodiments.

Referring to FIG. 18, a flow chart 1800 shows some additional steps of the method for generating a modulation signal described above with reference to FIG. 17, in accordance with some embodiments. At step 1805, a first RF carrier is modulated with the first modulation signal to generate a first modulated RF signal. The first modulated RF signal is coupled to a first antenna port. At step 1810, a second RF carrier with the second modulation signal to generate a second modulated RF signal. The second modulated RF signal is coupled to a second antenna port, wherein the second antenna port is different than the first antenna port.

Zadoff-Chu sequences keep their constant amplitude and correlation property after FFT and IFFT operations, meaning that if they are orthogonal in one domain they will be orthogonal in other domain as well. Another important point is that, due to the way that the ZC sequences are generated, the effective length of the sequences are $R^{NZ}$ not M. Therefore at most $R^{NZ}$ different cyclic shifts of the Zadoff-Chu sequence can be used to generate fully orthogonal Zadoff-Chu pilot signals. Different bases of the same Zadoff-Chu sequence length may be also be used to achieve a high degree of quasi-orthogonality (low cross-correlation) in some embodiments. It is this property that is described with reference to FIGS. 17 and 18. In cases in which different base ZC sequences are used, these sequences are not completely orthogonal but have a correlation of $$\frac{1}{\sqrt{R^{NZ}}}$$

which may be sufficiently small in long resource blocks to provide a desired accuracy of signal recovery in a receiver. Note that for small resource block lengths, $$\frac{1}{\sqrt{R^{NZ}}}$$

will not be a small number and application of Zadoff-Chu sequences with different bases may result in high interference and inaccurate channel estimation).

Benefits of embodiments described herein with reference to FIGS. 15-18 are that they can support simultaneous transmission of multiple orthogonal pilots (either in a multiple antenna case or in a case of inter-cell coordination transmissions from multiple cellular base stations for reducing the interference over pilot signals). To multiplex different pilots the property of the Zadoff-Chu sequences is used that Zadoff-Chu sequences of the same length and base are orthogonal to each other if they have different cyclic shift offset values, i.e., Zadoff-Chu sequences of any length have an "ideal" periodic autocorrelation (i.e., the correlation with the circularly shifted version of itself is a delta function).

The techniques described herein above as described with reference to FIGS. 13-18, may be used in combination. As an example, in a resource block of length 5 symbol-block (M=5) with α=0.3, there may be three interference-free samples. So, for up to 3 pilot signals a multiplexing of three Zadoff-Chu sequences (different cyclic shift values) with the same base u can be used: $r_u^{(0)}(k)$ (no cyclic shift), $r_u^{(1)}(k)$ (cyclic shift value of 1), and $r_u^{(2)}(k)$ (cyclic shift value of 2), where gcd(u, 3)=1, i.e., u=1 or 2. If more pilot symbol sequences are needed, ZC sequences can be added with base $u_n \neq u_q$, wherein the gcd($u_q$, 3)=1. Using both cyclic shifting and ZC sequences of the same length and different bases is a combination of techniques described with reference to FIGS. 15-18 that may be used in a signal transmitted on one antenna port or two or more signals formulated to simultaneously transmit resource blocks including different data symbols on different antenna ports. Also, the techniques with reference to FIGS. 13-14 of applying a phase shift to the pilot frequency domain samples or cyclic time shift to the pilot symbols on different pilot subcarriers of signal transmitted from a given antenna can be combined with the techniques with reference to FIGS. 15-18 of multiple orthogonal pilots signal generation for simultaneous transmission from different antenna ports to reduce the power variations of signals across the time slots or between symbols of a symbol-block from each antenna port of the different antenna ports.

Figure 19:
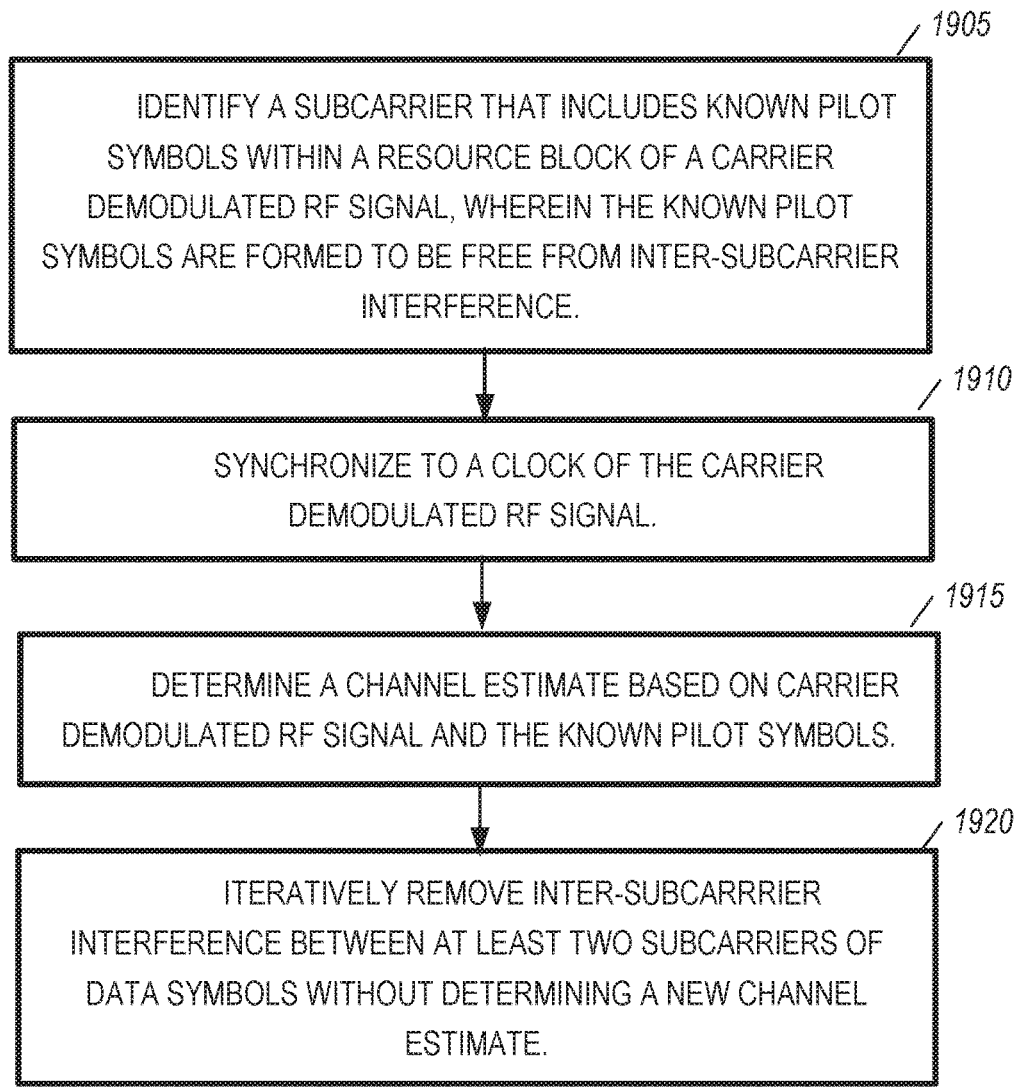
FIG. 19 is a flow chart that shows some steps of a method for receiving a carrier demodulated RF signal, in accordance with some embodiments.

Referring to FIG. 19, a flow chart 1900 shows some steps of a method for receiving a carrier demodulated RF signal, in accordance with some embodiments. At step 1905, a subcarrier that includes known pilot symbols within a resource block of the carrier demodulated RF is identified, wherein the known pilot symbols are formed to be free from inter-subcarrier interference. At step 1910, synchronization is performed to a clock of the carrier demodulated RF signal. At step 1915, a channel estimate based on carrier demodulated RF signal and the known pilot symbols is determined. At step 1920, inter-subcarrier interference between at least two subcarriers of data symbols is removed iteratively without determining a new channel estimate.

The iteration in step 1920 comprises, in some embodiments, a first estimate of the data symbols on the data subcarriers in the resource block is determined using the channel estimate assuming no inter-subcarrier interference between two adjacent subcarriers. This first estimate of data symbols forms the latest or most recent estimate of the data symbol estimate for the iterative (one or iteration) interference canceller. On an iteration of the interference canceller, for a data subcarrier, inter-subcarrier interference from at least one adjacent subcarrier of the data subcarrier is estimated based on the most recent estimate of the data symbol sequence on the at least one adjacent subcarrier, the subcarrier filter, and other characteristics of the resource block modulator. The estimated inter-subcarrier interference is subtracted from the carrier demodulated RF signal, and the data symbol sequence on the data subcarrier is re-estimated and becomes the most recent estimate of the data symbol sequence on the data subcarrier. This process (estimation of the inter-subcarrier interference on a data subcarrier, subtracting the estimate, and re-estimating the data symbol sequence on the data subcarrier resulting in the most recent estimate the data symbol sequence on the data subcarrier) is repeated for each data subcarrier (preferably sequentially in data subcarrier index) in the resource block using the latest or most recent estimate of the data symbol sequences on the adjacent subcarriers to estimate the inter-subcarrier interference on the data subcarrier. Once the data symbols on all the data subcarriers of the resource block are re-estimated, a next iteration of the interference canceller can be performed. The number of iterations may continue until a convergence criteria is met (e.g., packet is successfully decoded) or a maximum iteration limit is reached. In some embodiments, interference cancellation begins with the data subcarrier adjacent to the pilot subcarrier and sequentially proceeds to the other data subcarriers away from the pilot subcarrier.

It will be appreciated that an electronic device such as some of those described with reference to FIG. 1 can perform the methods described with reference to FIGS. 8-18.

It will be appreciated that an electronic device such as those described with reference to FIG. 2 can perform the methods described with reference to FIG. 19.

It should be apparent to those of ordinary skill in the art that for the methods described herein other steps may be added or existing steps may be removed, modified or rearranged without departing from the scope of the methods. Also, the methods are described with respect to the apparatuses described herein by way of example and not limitation, and the methods may be used in other systems.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element. The term "coupled" as used herein is defined as connected, although not necessarily directly and not necessarily mechanically.

Reference throughout this document are made to "one embodiment", "certain embodiments", "an embodiment" or similar terms The appearances of such phrases or in various places throughout this specification are not necessarily all referring to the same embodiment. Furthermore, the particular features, structures, or characteristics attributed to any of the embodiments referred to herein may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The processes illustrated in this document, for example (but not limited to) the method steps described in FIGS. 8-19, may be performed using programmed instructions contained on a computer readable medium which may be read by processor of a CPU. A computer readable medium may be any tangible medium capable of storing instructions to be performed by a microprocessor. The medium may be one of or include one or more of a CD disc, DVD disc, magnetic or optical disc, tape, and silicon based removable or non-removable memory. The programming instructions may also be carried in the form of packetized or non-packetized wireline or wireless transmission signals.

It will be appreciated that some embodiments may comprise one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods and/or apparatuses described herein. Alternatively, some, most, or all of these functions could be implemented by a state machine that has no stored program instructions, or in one or more application specific integrated circuits (ASICs), in which each function or some combinations of certain of the functions are implemented as custom logic. Of course, a combination of the approaches could be used.

Further, it is expected that one of ordinary skill, notwithstanding possibly significant effort and many design choices motivated by, for example, available time, current technology, and economic considerations, when guided by the concepts and principles disclosed herein will be readily capable of generating such stored program instructions and ICs with minimal experimentation.

In the foregoing specification, specific embodiments have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for generating a modulation signal, comprising:
   determining a quantity, N, of subcarriers that are to be used for transmitting a first resource block and a quantity, M, of resource elements corresponding to each subcarrier of the first resource block, wherein the first resource block comprises the N subcarriers and M multicarrier symbols and can be used to modulate a radio frequency (RF) carrier;
   determining a first resource element sequence, $M_n^P$, of M pilot symbols in the first resource block that corresponds to an $n^{th}$ of the N subcarriers, wherein a pilot frequency domain samples sequence, $r_n^P$, corresponding to the resource element sequence $M_n^P$, comprises a quantity, $R_n^{NZ}$, of non-zero magnitude pilot frequency domain samples, wherein $R_n^{NZ}$ is determined based on M and an excess bandwidth, $\alpha$, of an adjacent subcarrier filter;
   multiplexing the first resource element sequence $M_n^P$ with the N−1 resource element sequences that correspond to the N−1 subcarriers that are not the $n^{th}$ subcarrier, to form the first resource block; and
   generating a first modulation signal by modulating each of the N subcarriers with a corresponding resource element sequence of the N resource element sequences, which generates N modulated subcarriers, and filtering each of the N modulated subcarriers using a corresponding one of N subcarrier filters, wherein the N subcarrier filters include the adjacent subcarrier filter.

2. The method according to claim 1, wherein filtering each of the N modulated subcarriers comprises circularly filtering each modulated subcarrier using the corresponding one of the N subcarrier filters.

3. The method according to claim 1, where in the $R_n^{NZ}$ non-zero magnitude pilot frequency domain samples may not be within any excess bandwidth region of the subcarrier and are equally spaced about the center of the bandwidth of the subcarrier.

4. The method according to claim 1, wherein values of a pilot signal corresponding to the $n_{th}$ subcarrier of the first modulation signal in the first resource block are independent of the values of symbols in resource element sequences of any adjacent subcarrier.

5. The method according to claim 1, further comprising: determining $R_n^{NZ}$ as $$R_n^{NZ} = 2\left(M - 1 - \left\lfloor \frac{M}{2}(1+\alpha) \right\rfloor\right) + 1.$$

6. The method according to claim 1, further comprising: forming the pilot frequency domain sequence $r_n^P$ that comprises the $R_n^{NZ}$ non-zero magnitude pilot frequency domain samples mapped as contiguous frequency samples corresponding to the frequency samples close to the center of the pilot subcarrier and a quantity, $R_n^{NZ}$, of zero magnitude pilot frequency domain samples that is determined based on a subcarrier filter roll-off factor and M.

7. The method according to claim 1, further comprising: determining the $R^{NZ}$ non-zero magnitude pilot frequency domain samples based on a Zadoff-Chu sequence.

8. The method according to claim 7, wherein the Zadoff-Chu sequence has a length $R^{NZ}$.

9. The method according to claim 7, wherein the Zadoff-Chu sequence has a length less than $R^{NZ}$ and the $R^{NZ}$ non-zero magnitude pilot frequency domain samples are a cyclic extension of the Zadoff-Chu sequence.

10. The method according to claim 7, wherein the Zadoff-Chu sequence has a length more than $R^{NZ}$ and the $R^{NZ}$ non-zero magnitude pilot frequency domain samples are a truncation of the Zadoff-Chu sequence.

11. The method according to claim 1, further comprising:
    determining a second resource element sequence, $M_q^{p:\theta S}$, M pilot symbols that form a $q^{th}$ of the N subcarriers, wherein q≠n, and wherein pilot frequency domain samples, $r_n^P(i)$, of the $q^{th}$ subcarrier corresponding to the second resource element sequence $M_q^{p:\theta S}$ are each determined as at least a phase shift, $\theta(i)$, of the corresponding pilot frequency domain samples, $r_n^P(i)$, of the $n^{th}$ subcarrier, and wherein $\theta(i)=Q \cdot i$, and wherein Q is a phase constant; and
    multiplexing the second resource element sequence $M_q^{p:\theta S}$ with the N−1 resource element sequences that correspond to the N−1 subcarriers that are not the $q^{th}$ subcarrier to form the first resource block.

12. The method according to claim 1, further comprising:
    determining a second resource element sequence, $M_q^{p:\theta S}$, of M pilot symbols that form the resource elements for a $q^{th}$ one of the N subcarriers of the first resource block, wherein q≠n, and wherein the pilot symbols, $d_q^P$, 0<i<M−1, of the $q^{th}$ subcarrier are each determined as a cyclical time shift of the pilot symbols, $d_n^P$, o<i<M−1, of the $n^{th}$ subcarrier; and
    multiplexing the second resource element sequence $M_q^{p:TS}$ with the N−1 resource element sequences that correspond to the N−1 subcarriers that are not the $q^{th}$ subcarrier, to form the first resource block.

13. The method according to claim 1, further comprising:
    determining a second resource element sequence, $M_q^{p:CS}$, of M pilot symbols that correspond to a $q^{th}$ of N subcarriers of a second resource block, wherein a pilot frequency domain samples sequence, $r_q^{p:U}$, corresponding to the second resource element sequence, $M_q^{p:CS}$, comprises $R_q^{NZ}$ non-zero magnitude pilot frequency domain samples, and wherein the $R_q^{NZ}$ non-zero magnitude pilot frequency domain samples of the pilot frequency domain samples sequence $r_q^{p:U}$ of the second resource block are determined as a cyclical shifts of the respective $R_n^{NZ}$ non-zero magnitude pilot frequency domain samples of the pilot frequency domain samples sequence $r_n^P$ of the first resource element sequence $M_q^P$ of the first resource block;
    multiplexing the second resource element sequence $M_q^{p:CS}$ with the N−1 resource element sequences that correspond to the N−1 subcarriers that are not the $q^{th}$ subcarrier, to form the second resource block; and
    generating a second modulation signal by modulating each subcarrier with a corresponding resource element sequence of the second resource block, which generates N modulated subcarriers of the second resource block, and filtering each of the N modulated subcarriers of the second resource block using a corresponding one of N subcarrier filters.

14. The method according to claim 13, further comprising:
modulating a first RF carrier with the first modulation signal to generate a first modulated RF signal and coupling the first modulated RF signal to a first antenna port; and
modulating a second RF carrier with the second modulation signal to generate a second modulated RF signal and coupling the second modulated RF signal to a second antenna port, wherein the second antenna port is different than the first antenna port.

15. The method according to claim 1, further comprising:
determining a second resource element sequence, $M_q^{P:U}$, of M pilot symbols that correspond to $q^{th}$ of N subcarriers of a second resource block, wherein a pilot frequency domain samples sequence, $r_q^{P:U}$, corresponding to the second resource element sequence $M_q^{P:U}$, comprises $R_q^{NZ}$ non-zero magnitude values, and wherein the $R_n^{NZ}$ non-zero magnitude pilot frequency domain samples of the pilot frequency domain samples sequence $r_n^P$ are based on a first Zadoff-Chu sequence having a first base, and wherein the $R_q^{NZ}$ non-zero magnitude pilot frequency domain samples $r_q^{P:U}(i_{NZ})$ of the pilot frequency domain samples sequence, $r_q^{P:U}$ are based on a second Zadoff-Chu sequence having a second base, and wherein the first base is different than the second base;
multiplexing the second resource element sequence $M_q^U$ with the N−1 resource element sequences that correspond to the N−1 subcarriers that are not the $q^{th}$ subcarrier to form the second resource block; and
generating a second modulation signal by modulating each subcarrier with a corresponding resource element sequence of the second resource block, which generates N modulated subcarriers, and filtering each of the N modulated subcarriers using a corresponding one of N subcarrier filters.

16. The method according to claim 15, further comprising:
modulating a first RF carrier with the first modulation signal to generate a first modulated RF signal and coupling the first modulated RF signal to a first antenna port; and
modulating a second RF carrier with the second modulation signal to generate a second modulated RF signal and coupling the second modulated RF signal to a second antenna port, wherein the second antenna port is different than the first antenna port.

17. A method for receiving a carrier demodulated RF signal, comprising:
identifying a subcarrier that includes known pilot symbols within a resource block of the carrier demodulated RF signal, wherein the known pilot symbols are formed to be free from inter-subcarrier interference and forming the known pilot signals comprises;
determining a quantity, N, of subcarriers that are to be used for transmitting a first resource block and a quantity, M, of resource elements corresponding to each subcarrier of the first resource block, wherein the first resource block comprises the N subcarriers and M multicarrier symbols and can be used to modulate a radio frequency (RF) carrier;
determining a first resource element sequence, $M_n^P$, of M pilot symbols in the first resource block that corresponds to an $n^{th}$ of the N subcarriers, wherein a pilot frequency domain samples sequence, $r_n^P$, corresponding to the resource element sequence M, comprises a quantity, $R_n^{NZ}$, of non-zero magnitude pilot frequency domain samples, wherein $R_n^{NZ}$ is determined based on M and an excess bandwidth, $\alpha$, of an adjacent subcarrier filter;
multiplexing the first resource element sequence $M_n^P$ with the N−1 resource element sequences that correspond to the N−1 subcarriers that are not the nlh subcarrier, to form the first resource block;
generating a first modulation signal by modulating each of the N subcarriers with a corresponding resource element sequence of the N resource element sequences, which generates N modulated subcarriers, and filtering each of the N modulated subcarriers using a corresponding one of N subcarrier filters, wherein the N subcarrier filters include the adjacent subcarrier filter;
synchronizing to a clock of the carrier demodulated RF signal;
determining a channel estimate based on carrier demodulated RF signal and the known pilot symbols; and
iteratively removing inter-subcarrrier interference between at least two subcarriers of data symbols without determining a new channel estimate.

18. An apparatus, comprising:
a processing system comprising a processor and a memory, wherein the memory includes program instructions that control the processor to
determine a quantity, N, of subcarriers that are to be used for transmitting a first resource block and a quantity, M, of resource elements corresponding to each subcarrier of the first resource block, wherein the first resource block comprises the N subcarriers and M multicarrier symbols and can be used to modulate a radio frequency (RF) carrier,
determine a first resource element sequence, $M_n^P$, of M pilot symbols in the first resource block that corresponds to an $n^{th}$ of the N subcarriers, wherein a pilot frequency domain samples sequence, $r_n^P$, corresponding to the resource element sequence $M_n^P$, comprises a quantity, $R_n^{NZ}$, of non-zero magnitude pilot frequency domain samples, wherein $R_n^{NZ}$ is determined based on M and an excess bandwidth, $\alpha$, of an adjacent subcarrier filter,
multiplex the first resource element sequence $M_n^P$ with the N−1 resource element sequences that correspond to the N−1 subcarriers that are not the $n^{th}$ subcarrier, to form the first resource block, and
generate a first modulation signal by modulating each of the N subcarriers with a corresponding resource element sequence of the N resource element sequences, which generates N modulated subcarriers, and filtering each of the N modulated subcarriers using a corresponding one of N subcarrier filters, wherein the N subcarrier filters include the adjacent subcarrier filter; and
an RF final stage that modulates an RF carrier with the first modulation signal to generate a modulated RF signal, amplifies the modulated RF signal to generate an amplified RF signal, and couples the amplified RF signal to an antenna.

19. A non-transitory computer readable media comprising programmed instructions that when executed by a processor performs:

determining a quantity, N, of subcarriers that are to be used for transmitting a first resource block and a quantity, M, of resource elements corresponding to each subcarrier of the first resource block, wherein the first resource block comprises the N subcarriers and M multicarrier symbols and can be used to modulate a radio frequency (RF) carrier;

determining a first resource element sequence, $M_n^P$, of M pilot symbols in the first resource block that corresponds to an $n^{th}$ of the N subcarriers, wherein a pilot frequency domain determining a first resource element sequence, M~, of M pilot symbols in the first resource block that corresponds to an $n^{th}$ of the N subcarriers, wherein a pilot frequency domain samples sequence, $r_n^P$, corresponding to the resource element sequence $M_n^P$, comprises a quantity, $R_n^{NZ}$, of non-zero magnitude pilot frequency domain samples, wherein $R_n^{NZ}$ is determined based on M and an excess bandwidth, $\alpha$, of an adjacent subcarrier filter;

multiplexing the first resource element sequence $M_n^P$ with the N−1 resource element sequences that correspond to the N−1 subcarriers that are not the $n^{th}$ subcarrier, to form the first resource block; and generating a first modulation signal by modulating each of the N subcarriers with a corresponding resource element sequence of the N resource element sequences, which generates N modulated subcarriers, and filtering each of the N modulated subcarriers sing a corresponding one of N subcarrier filters, wherein the N subcarrier filters include the adjacent subcarrier filter.

\* \* \* \* \*